(12) United States Patent
Miyatake

(10) Patent No.: US 7,538,925 B2
(45) Date of Patent: May 26, 2009

(54) OPTICAL SCANNER INCLUDING A LENS SURFACE THAT DOES NOT HAVE A CURVATURE IN THE SUB-SCANNING DIRECTION AND A LINE DESCRIBING THIS SURFACE IN THE SUB-SCANNING DIRECTION HAS A TILT WHICH VARIES DEPENDING ON A LOCATION OF THE LINE IN THE MAIN SCANNING DIRECTION, THE TILT OF THE LINE DEFINING AN ANGLE WHICH IS MEASURED WITH RESPECT TO THE SUB-SCANNING DIRECTION, AND AN IMAGE FORMING APPARATUS INCLUDING THE LENS

(75) Inventor: Naoki Miyatake, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/358,554

(22) Filed: Feb. 22, 2006

(65) Prior Publication Data
US 2006/0203264 A1  Sep. 14, 2006

(30) Foreign Application Priority Data
Mar. 11, 2005  (JP) ............................ 2005-069323

(51) Int. Cl.
*G02B 26/08*  (2006.01)
(52) U.S. Cl. ..................................... 359/207
(58) Field of Classification Search ................. 359/205, 359/206, 207
See application file for complete search history.

(56) References Cited

U.S. PATENT DOCUMENTS

| | | | | |
|---|---|---|---|---|
| 5,694,236 | A | * | 12/1997 | Sekikawa ................... 359/206 |
| 5,805,323 | A | * | 9/1998 | Ichikawa .................... 359/205 |
| 2003/0193703 | A1 | * | 10/2003 | Takakubo ................... 359/207 |
| 2004/0169905 | A1 | * | 9/2004 | Hayashi et al. ............. 359/204 |

FOREIGN PATENT DOCUMENTS

| | | |
|---|---|---|
| JP | 11-14932 | 1/1999 |
| JP | 11-38348 | 2/1999 |
| JP | 2001-4948 | 1/2001 |
| JP | 2001-10107 | 1/2001 |
| JP | 2001-33720 | 2/2001 |
| JP | 3295281 | 4/2002 |
| JP | 2003-5114 | 1/2003 |
| JP | 3450653 | 7/2003 |
| JP | 2004-70109 | 3/2004 |

* cited by examiner

*Primary Examiner*—Stephone B. Allen
*Assistant Examiner*—Jennifer L Doak
(74) *Attorney, Agent, or Firm*—Dickstein Shapiro LLP

(57) ABSTRACT

An optical scanner including a plurality of light source units outputting a corresponding light beam, a light deflector having a deflecting surface that deflects the light beams output from the light source units, and a scanning optical system that condenses each light beam deflected by the light deflector onto a corresponding scanning surface. The light beams output from the light source units make an angle in a sub-scanning direction with respect to a plane normal to the deflecting surface. Further, at least one surface of the scanning optical system is a surface that does not have a curvature in the sub-scanning direction and has different tilt decentration angles in the sub-scanning direction according to a position in the main scanning direction.

13 Claims, 17 Drawing Sheets $\beta s1 > \beta s2$

LIGHT DEFLECTOR HEIGHT IN SUB-SCANNING DIRECTION (h): MEDIUM
ANGLE IN SUB-SCANNING DIRECTION ($\beta$): SMALL LIGHT DEFLECTOR HEIGHT IN SUB-SCANNING DIRECTION (h): LARGE
ANGLE IN SUB-SCANNING DIRECTION ($\beta$): NONE LIGHT DEFLECTOR HEIGHT IN SUB-SCANNING DIRECTION (h): SMALL
ANGLE IN SUB-SCANNING DIRECTION ($\beta$): LARGE

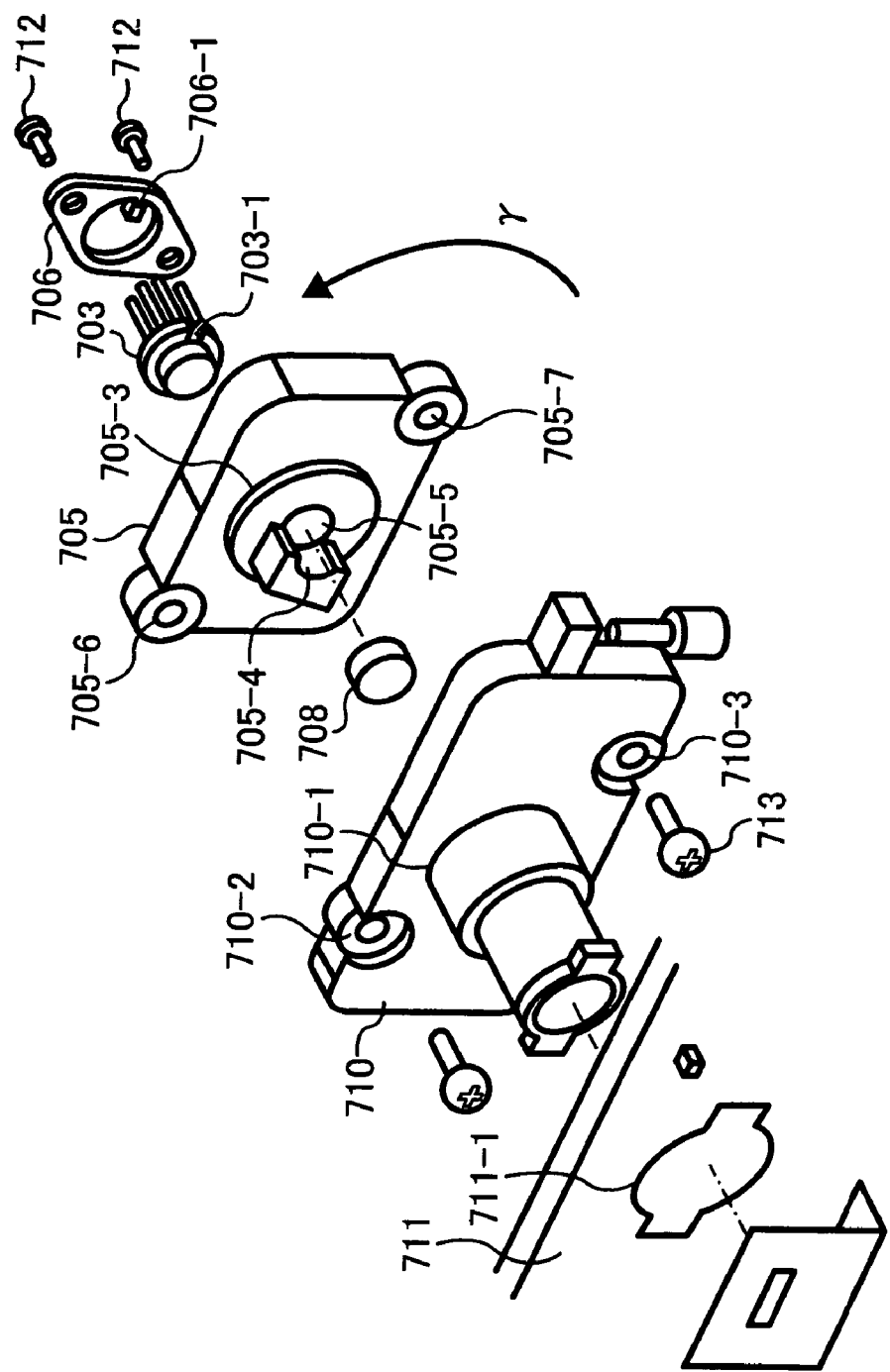

LENS HEIGHT VS INCLINATION ($\beta$)

LENS HEIGHT VS INCLINATION ($\beta$)

OPTICAL SCANNER INCLUDING A LENS SURFACE THAT DOES NOT HAVE A CURVATURE IN THE SUB-SCANNING DIRECTION AND A LINE DESCRIBING THIS SURFACE IN THE SUB-SCANNING DIRECTION HAS A TILT WHICH VARIES DEPENDING ON A LOCATION OF THE LINE IN THE MAIN SCANNING DIRECTION, THE TILT OF THE LINE DEFINING AN ANGLE WHICH IS MEASURED WITH RESPECT TO THE SUB-SCANNING DIRECTION, AND AN IMAGE FORMING APPARATUS INCLUDING THE LENS

CROSS-REFERENCE TO RELATED APPLICATIONS

The present document incorporates by reference the entire contents of Japanese priority document, 2005-069323 filed in Japan on Mar. 11, 2005.

BACKGROUND OF THE INVENTION

1. Field of the Invention

The present invention relates to an optical scanner that can be used in an image forming apparatus such as a digital copier, a laser printer, a laser facsimile and so forth, and to an image forming apparatus that includes an optical scanner.

2. Description of the Related Art

An optical scanner is used in laser printers or the like to scan a scanning surface and obtain image data of the scanning surface. A typical optical scanner includes a light deflector that receives a light beam from a light source and deflects the light beam, and a scanning/imaging optical system such as a fθ lens that condenses the deflected light beam to create a beam spot on a scanning surface and scan the scanning surface with the beam spot. The direction in which the beam spot scans the scanning surface is called a main scanning direction and the process is called main scanning. In practice, a photosensitive surface of a photoconductive drum or the like is a typical example of the scanning surface.

Full-color image forming apparatuses include a plurality of photoconductors, e.g., four, aligned along a conveying direction of recording paper; a deflector that deflection-scans the light beam of light beams emitted by a plurality of light source units, corresponding respectively to the photoconductors; a plurality of scanning/imaging optical systems, corresponding respectively to the photoconductors that simultaneously expose the photoconductors thus to create a latent image; and a developer that employs developing agents of different colors such as, for example, yellow, magenta, cyan and black, to thereby visualize the latent image, so that a colored image is obtained upon sequentially transferring the visual images onto a recording paper and fixing the total image. Such an image forming apparatus that includes two or more sets of optical scanners and photoconductors to produce two-color, multi-color or full-color images is known as a tandem-engine image forming apparatus. Some tandem-engine image forming apparatuses include a plurality of photoconductive media and a single deflector for shared use. Examples of such image forming apparatuses are given below.

(1) An apparatus that has a plurality of light beams generally parallel to one another and separated in a sub-scanning direction made incident to a light deflector for deflecting the respective deflected light beams through a plurality of scanning optical elements aligned in the sub-scanning direction so as to, respectively, correspond to the light beams, so that the light beams are scanned on a surface of photoconductors, respectively, corresponding to each light beam is disclosed in Japanese Published Unexamined Patent Application No. H09-54263.

Accordingly, a separate scanning optical system is independently provided so as to handle each light beam.

(2) An apparatus provided with a scanning optical system including three optical elements L1, L2 and L3, wherein a plurality of light beams are made incident upon one side of a light deflector, so that the light beams directed to different scanning surfaces are transmitted through two of the optical elements L1, L2, and the remaining optical element L3 is disposed on each scanning surface, is disclosed in Japanese Published Unexamined Patent Application Nos. 2001-4948, 2001-10107 and 2001-33720. In this apparatus, a part of the optical elements constituting the scanning optical system is shared by the light beams, and the rest of the optical elements are disposed so as to respond to each light beam, respectively.

These apparatuses employ a single light deflector to be shared by a plurality of scanning surfaces, which allows a reduction in the number of light deflectors, thus reducing the dimensions of the image forming apparatus. This also applies to an optical scanner of a full-color image forming apparatus that includes scanning surfaces (photoconductors) compatible with four different colors, such as, cyan, magenta, yellow and black. When used in the optical scanner of such a full-color image forming apparatus, however, the light deflector (for example a polygon mirror), has to be sufficiently large in the sub-scanning direction. This is because the light beams directed in the sub-scanning direction to the photoconductors are aligned generally parallel to each other when entering the light deflector. In general, the cost of the polygon mirror (light deflector) section comprises a considerable portion in the cost of optical elements forming the optical scanner. Therefore, employing a large polygon mirror limits the desired reduction in cost and dimensions of the overall imaging apparatus.

Accordingly, an oblique incidence optical system, in which the light beam is made incident upon the deflecting surface of the light deflector with an angle in the sub-scanning direction has been developed, in an attempt to reduce the cost of the optical scanner of a color image forming apparatus by employing a single light deflector, as disclosed in Japanese Published Unexamined Patent Application No. 2003-5114. In the oblique incidence optical system, the light beams are separated by a beam bending mirror or the like after being reflected by the deflecting surface, thus the light beams are led to the corresponding scanning surface (photoconductor). Here, the angles of the respective light beams in the sub-scanning direction (the oblique incidence angle to the light deflector) are determined so as to allow the beam bending mirror to separate the light beams. Adopting such an oblique incidence optical system allows for the necessary spacing between the light beams in the sub-scanning direction (so as to enable the beam bending mirror to separate the light beams), without increasing the size of the light deflector, i.e., without increasing the number of elements or the thickness of the polygon mirror in the sub-scanning direction.

There are a number of issues when employing a polygon mirror as the light deflector in the oblique incidence optical system. It is difficult to allow the light beam from the light source enter the rotation axis of the polygon mirror, by an ordinary incidence system. When the light beam is made incident upon the rotation axis of the polygon mirror, each deflecting surface inevitably must be very large in order to secure a necessary deflection angle, which inhibits reducing the dimensions of the polygon mirror. A larger deflecting surface incurs a greater "sag." The sag thus generated is asymmetric with respect to the field height: 0, which makes subsequent corrections more complicated. Moreover, a larger polygon mirror requires larger energy for high-speed rotation thereof, and since wind noise due to the high-speed rotation naturally becomes larger, a larger scale sound shielding means is also required.

Using, the oblique incidence system, however, allows the light beam from the light source to be made incident on the rotational axis of the polygon mirror. Therefore, the polygon mirror can be made in smaller dimensions, thereby reducing the wind noise from the high-speed rotation. This makes the oblique incidence system appropriate for high-speed operation. Reducing the size of the polygon mirror will naturally reduce the sag, in which case the sag can be made symmetric with respect to the field height: 0 and subsequent corrections can then be easily made.

The oblique incidence system has, however, a drawback that a larger scanning line curvature is incurred. The amount of curvature in the scanning line differs depending on the oblique incidence angle in the sub-scanning direction with respect to the deflecting surface of each light beam. This difference is visualized upon developing the latent image drawn by each light beam on the photoconductor with a toner of the corresponding color, resulting in color deviation when the toner images are stacked. Moreover, because of the oblique incidence angle, the light beam is twisted when entering the scanning lens, which increases the wavefront aberration, thereby significantly degrading the optical performance, especially at peripheral field height and thus increasing the beam spot diameter. This increase in wavefront aberration and beam spot diameter inhibits achieving a higher image quality.

The increased scanning line curvature is caused because in the oblique incidence system, the light source must be disposed at a position overlapping the optical axis of the scanning lens in the sub-scanning direction, so as to direct the light beam from the light source to the rotation axis of the polygon mirror. Because of this configuration, the oblique incidence angle to the deflecting surface must be increased in order to avoid interference with the scanning lens. This increased surface leads to the increase in the scanning line curvature and the problems thereby incurred, which are previously discussed.

In order to correct for the large scanning line curvature unique to the oblique incidence system, for example, Japanese Published Unexamined Patent Application No. H11-14932 proposes employing, in the scanning/imaging optical system, a lens having the specific surface inclination in the sub-scanning cross-section modified in the main scanning direction so as to correct the scanning line curvature. Japanese Published Unexamined Patent Application No. H11-38348 proposes including, in the scanning/imaging optical system, a correcting reflection surface having the specific surface inclination in the sub-scanning cross-section modified in the main scanning direction so as to correct the scanning line curvature.

Also, Japanese Published Unexamined Patent Application No. 2004-70109 proposes transmitting the obliquely incoming beam through a position deviated from the axis of the scanning lens and employing a surface that varies the amount of aspherical portion in the child line of the scanning lens along the main scanning direction, to thereby correctly align the scanning lines. However, in the invention according to Japanese Published Unexamined Patent Application No. 2004-70109, in which the correction is performed with a single lens, no reference is made about the degradation in beam spot diameter due to the increase in wavefront aberration described below, though the scanning line curvature can be corrected.

Another drawback of the oblique incidence system is that significant degradation due to wavefront aberration is prone to be incurred in the peripheral field height, because of a light skew. The wavefront aberration leads to an increase in beam spot diameter in the peripheral field height. Solving this problem is indispensable in satisfying the recent increasing demand for higher density optical scanning. Although the optical scanner according to Japanese Published Unexamined Patent Application No. 2004-70109 effectively corrects for the large scanning line curvature unique to the oblique incidence system, this invention does not provide an effective solution for wavefront aberration.

Japanese Published Unexamined Patent Application No. H10-73778 proposes an optical scanner that includes a plurality of rotating asymmetrical lenses in the scanning/imaging optical system, such that the profile of the generating line connecting the vertices of the rotating asymmetrical lens surfaces is curved in the sub-scanning direction, for effectively correcting the scanning line curvature and the wavefront aberration incidental to the oblique incidence system.

However, the lenses having "surfaces that form the generating line connecting the vertices thereof curved in the sub-scanning direction" solve the problems associated with the oblique incidence system by curving the generating line. This method requires scanning lenses to be individually provided for each incoming beam. Accordingly, employing such lenses in the tandem-engine scanning optical system requires a corresponding number of scanning lenses to the number of light beams. When a plurality of light beams directed to different scanning surfaces are made incident upon a single lens, curving the profile of the generating line can solve the problems with respect to one of the light beams, however, it is difficult to reduce the scanning line curvature or wavefront aberration with respect to the other light beam.

Moreover, the optical scanner according to Japanese Published Unexamined Patent Application No. H10-73778 has a drawback that, because of the curvature in the sub-scanning direction, when the light beams incident upon the scanning lens are shifted in the sub-scanning direction (e.g., by an assembly error, processing error or environmental fluctuation), the profile of the scanning line curvature is varied by an influence of the refracting power of the lens in the sub-scanning direction. This variation results in a failure of achieving the initial or specified performance of color difference prevention, and hence results in color deviation in the printed color image.

Further, in the aspect of correction of wavefront aberration, since the shift of the incoming beam creates a significant fluctuation of light beam skew for a surface with a curvature, it is difficult to stably obtain the appropriate beam spot diameter.

The invention according to Japanese Published Unexamined Patent Application No. 2003-5114, which proposes an oblique incidence system, also employs a similar surface to that of Japanese Published Unexamined Patent Application No. H10-73778 to thereby correct for the scanning line curvature. However, for the reasons described so far, the appropriate beam spot diameter cannot be stably obtained by the invention of Japanese Published Unexamined Patent Application No. 2003-5114.

SUMMARY OF THE INVENTION

It is an object of the present invention to solve the problems in the conventional technology with respect to the scanning line curvature, increased wavefront aberration, and maintenance of appropriate beam spot diameter.

According to an aspect of the present invention, an optical scanner includes a plurality of light source units, each light source unit outputting a corresponding light beam; a light deflector having a deflecting surface that deflects the light beams output from the light source units; and a scanning optical system that condenses each light beam deflected by the light deflector onto a corresponding scanning surfaces. The light beams output from the light source units make an angle in a sub-scanning direction with respect to a normal to the deflecting surface. At least one surface of the scanning optical system has not curvature in the sub-scanning direction, and is a special surface having different tilt decentration angles in the sub-scanning direction according to a position in the main scanning direction.

According to another aspect of the present invention, an image forming apparatus includes the above optical scanner.

The other objects, features, and advantages of the present invention are specifically set forth in or will become apparent from the following detailed description of the invention when read in conjunction with the accompanying drawings.

BRIEF DESCRIPTION OF THE DRAWINGS

FIGS. 11A, 11B and 11C are exploded perspective views showing various examples of light source units applicable to a fifth embodiment of the present invention;

DETAILED DESCRIPTION OF THE PREFERRED EMBODIMENTS

Exemplary embodiments of the optical scanner and image forming apparatus according to the present invention will be described, referring to the accompanying drawings.

Figure 1:
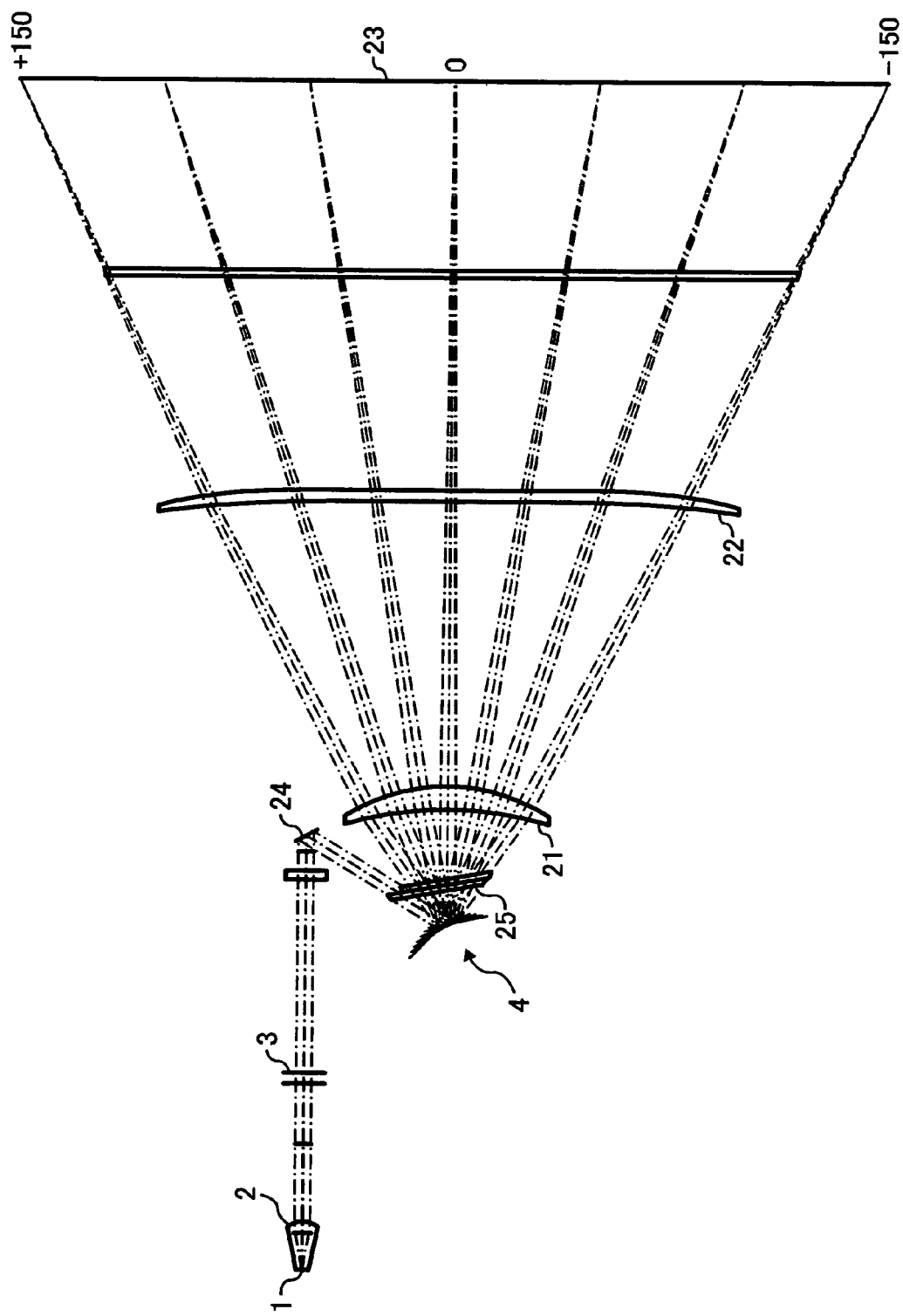
FIG. 1 is schematic showing optical scanning performed by an optical scanner according to a first embodiment of the present invention.

FIG. 1 illustrates an embodiment of an optical scanner according to a first embodiment of the present invention. In FIG. 1, a divergent light flux emitted by a semiconductor laser 1 (serving as a light source) is converted by a coupling lens 2 into a light beam form appropriate for the subsequent optical system. The light beam form converted by the coupling lens 2 may be a parallel beam, or a slightly divergent or slightly convergent beam. The light beam that has passed through the coupling lens 2 is condensed by a cylindrical lens 3 in a sub-scanning direction only, and may be deflected off optional mirror 24 and deflects off of the deflecting surface of a polygon mirror 4 (serving as a light deflector). The light beam forms a lengthy linear image in the main scanning direction, close to the deflecting surface. The polygon mirror 4 is rotationally driven at a constant speed by a motor, to thereby deflect the light beam incident upon the deflecting surface at an equiangular speed.

Figure 3A:
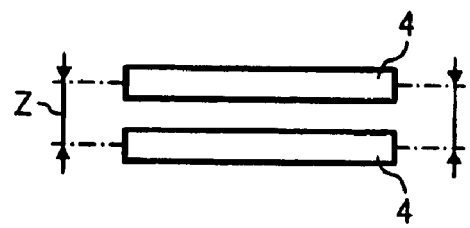
FIG. 3A is a schematic showing a light beam incident upon a light deflector of a conventional optical scanner.
Figure 3B:
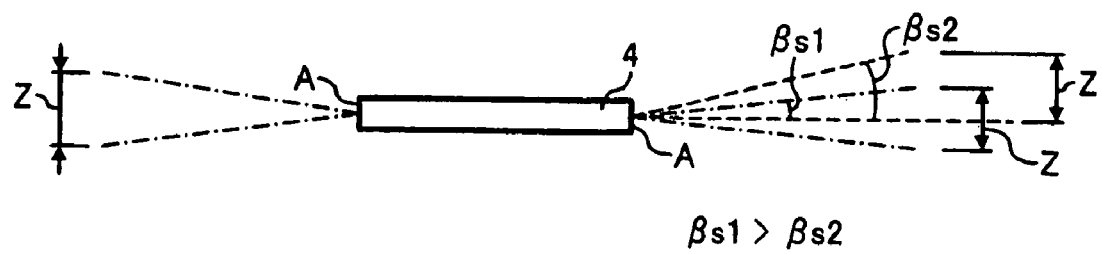
FIG. 3B is a schematic showing a light beam incident upon the light deflector shown in FIG. 2B according to an embodiment of the invention.

As shown in FIG. 3B, the light beam from the light source is made incident with an angle inclination with respect to a plane A orthogonal to the rotational axis of the deflecting surface of the polygon mirror 4. Accordingly, the light beam reflected by the deflecting surface is also inclined with respect to the plane A. In order to achieve this angle of incidence, a first optical system including the light source unit, the coupling optical system, the cylindrical lens 3 and so on may be oriented with the desired angle, or a beam bending mirror may be employed to thereby change the angle of the light beam. Alternatively, the optical axis of the first optical system may be shifted in the sub-scanning direction, so as to incline the light beam.

Referring again to FIG. 1, the light beam reflected by the deflecting surface of the polygon mirror 4 is deflected at an equiangular speed with the constant velocity rotation of the polygon mirror 4, and transmitted through a first scanning lens 21 and a second scanning lens 22 constituting the scanning optical system, thus to be condensed onto a scanning surface 23. Thus, the scanning optical system serves to condense the deflected light beam onto the scanning surface 23, creating a beam spot on the scanning surface. The scanning surface may be composed of, for example, a photoconductive surface. The scanning optical system thus scans on the scanning surface 23 at a constant velocity with the beam spot.

Figure 2A:
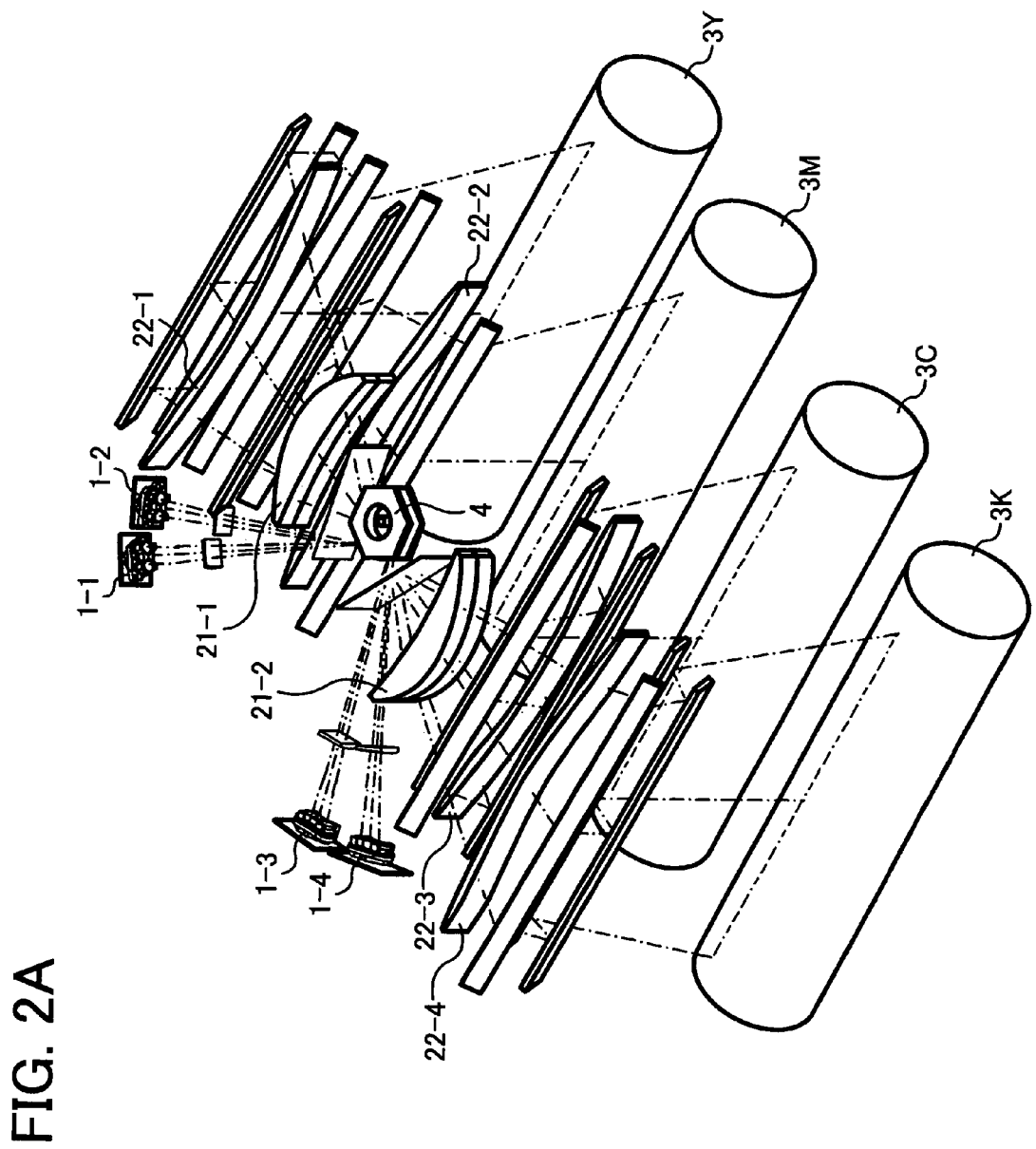
FIG. 2A is a perspective view of the optical scanner.
Figure 2B:
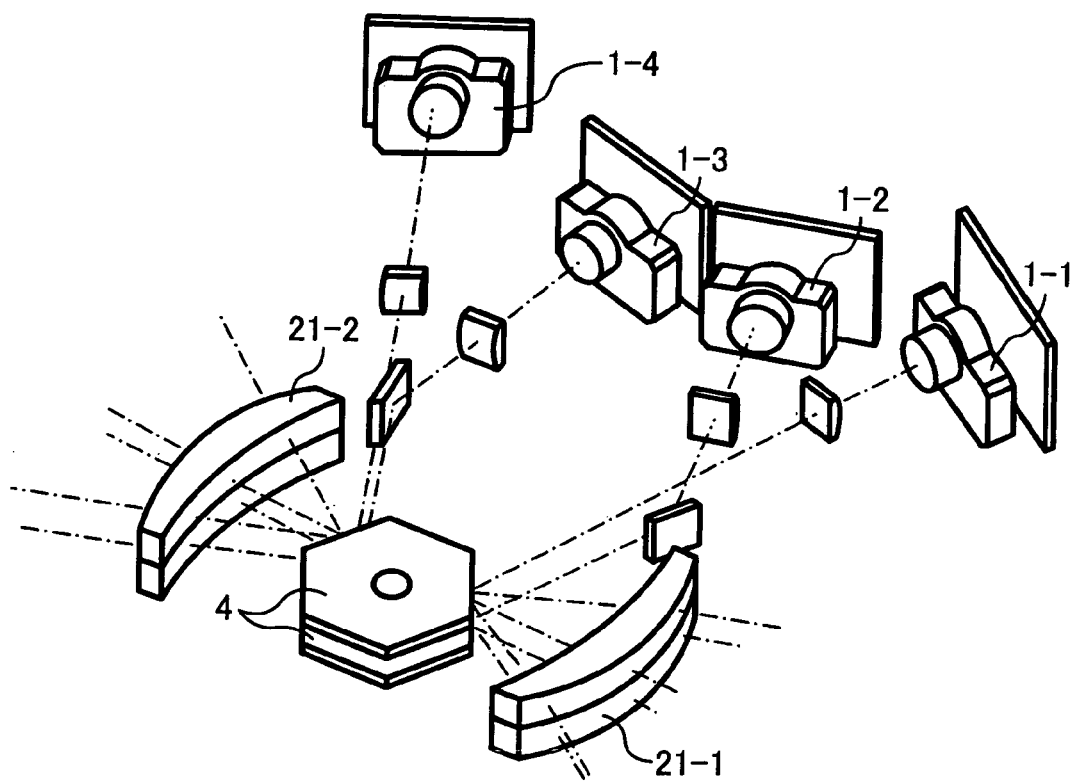
FIG. 2B is a perspective view of the light source unit shown in FIG. 2A.

As described above, the first embodiment represents an oblique incidence optical system. The features of the oblique incidence optical system will be described below using a tandem engine color image forming apparatus as an example. The optical scanner shown in FIGS. 2A and 2B is of a counter scanning type optical scanner in which the light beams are made incident from both sides of the polygon mirror 4 serving as the light deflector. In this way, the light beams are deflected toward both sides of the polygon mirror 4. In the counter scanning type optical scanner, the polygon mirror 4 includes two tiers of deflecting surfaces so as to receive the light beams at the respective tiers of the deflecting surface. This secures an appropriate spacing Z necessary for separating the light beams directed to the corresponding scanning surfaces, as shown in FIG. 3A. The deflecting surface may be constituted of a single tier instead of two, in which case, however, the polygon mirror 4 must be excessively thick in the sub-scanning direction, thereby impeding the achievement of a higher speed and cost reduction.

The oblique incidence optical system according to the first embodiment eliminates the need to make a plurality of light beams incident on the deflecting surface of the polygon mirror 4 with a certain spacing between them in the sub-scanning direction. Instead, as shown in FIG. 3B, in the embodiment, pairs of light beams from a plurality of light source units, having different angles of inclination in the sub-scanning direction with respect to the plane normal to the deflecting surface of the polygon mirror 4 are made incident upon a respective plurality of different reflection surfaces of the same polygon mirror 4 from left and right, as shown in FIG. 3B. This arrangement provides several advantages. The deflecting surfaces of the polygon mirror 4, which is a polyhedron, can be made in a single tier. The polygon mirror 4 can be made thinner in the sub-scanning direction. The rotational inertia of the polygon mirror 4 can be reduced. Start-up time for the system can be shortened.

In addition, the manufacturing cost can be reduced in comparison with the polygon mirror 4 having two-tiers of deflecting surfaces employed in the conventional counter scanning system.

The first embodiment allows the angle of incidence of the light beam in the sub-scanning direction with respect to the plane normal to the deflecting surface of the polygon mirror 4 to be set at the smallest angle among the oblique incidence optical system, as shown in FIG. 3B. FIG. 3B depicts an example of the oblique incidence optical system, in which the broken line represents a light beam layout in a one-side scanning system, to be described later, and an oblique incidence angle is represented by $\beta s2$. In the counter scanning system, the oblique angle of incidence is $\beta s1$ as indicated by the solid line, which is smaller than the oblique angle of incidence $\beta s2$ in the one-side scanning system.

In an optical system such as the counter scanning system, in which one side corresponds to two different scanning surfaces, all of the light beams directed to the two different scanning surfaces are made incident upon the light deflector at an angle with respect to the plane normal to the deflecting surface of the light deflector, i.e., an angle in the sub-scanning direction. This allows a reduction in the cost of the light deflector, which comprises a considerable portion of the overall cost of the optical scanner, as well as a reduction in the power consumption and noise, thus providing a more environmentally-friendly optical scanner.

It is known that when the light beams are made incident to the scanning lens at an angle in the sub-scanning direction, that this leads to an increase in aberrations and hence to a degradation in optical performance. This is unlike the conventional horizontal incidence system in which the light beams are made incident parallel to the plane normal to the deflecting surface. Accordingly, the present invention employs a special surface on at least on one surface of the scanning optical system, to thereby correct for the degradation in optical performance. For the correction, the angle with respect to the plane normal to the deflecting surface of the polygon mirror 4, at which the light beam is made incident at is reduced which allows a minimization of the degradation in optical performance. Thus an excellent optical performance is achieved. Consequently, an appropriate beam spot diameter can be stably obtained; therefore the quality of the formed image can be improved as a result of the finer beam spot diameter.

Figure 4A:
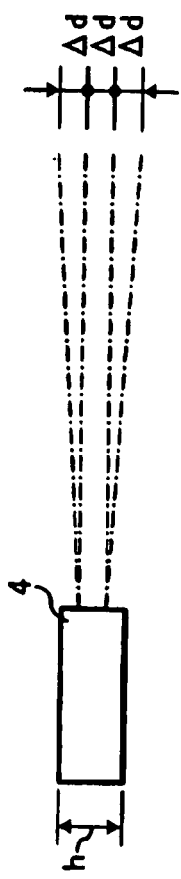
FIGS. 4A, 4B and 4C show various examples of light beams incident upon a light deflector.
Figure 4B:
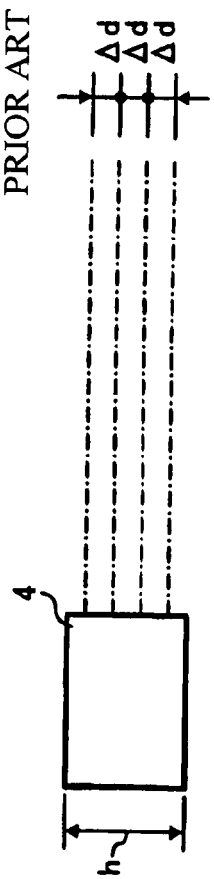

A variation of the first embodiment of the optical scanner applicable to the tandem engine color image forming apparatus will now be described, using the one-side scanning system as an example. For the purpose of description, a spacing $\Delta d$ is defined as the spacing necessary for separating a plurality of light beams that are deflected to one side by the polygon mirror into individual light beams at positions spaced from the polygon mirror by a predetermined distance. The spacing $\Delta d$ is in the range of 3 millimeters to 5 millimeters. In the conventional optical scanner (in which all light beams are parallel to the plane normal to the deflecting surface of the polygon mirror 4 as shown in FIG. 4B), an excellent optical performance can be achieved. However, for separating the light beam from the respective light source units, the spacing $\Delta d$ is necessary on the position of the deflecting surface of the polygon mirror 4. Accordingly, the height h (dimension in the sub-scanning direction, which may also be called thickness) of the polygon mirror 4, which serves as the light deflector, must be increased, causing the contact area with air to also be increased, thereby resulting in an increase in power consumption (due to air resistance during rotation), in noise and in manufacturing cost. In particular, the cost issue is critical, since the cost of the polygon mirror 4 acting as the light deflector comprises a significant portion of the overall parts cost of the optical scanner.

Figure 4C:
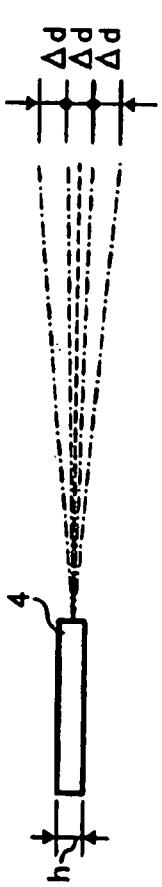

In contrast, in the optical scanner according to the variation of the first embodiment (FIGS. 4A, 4C), the light beams from the light source units to be reflected by the deflecting surface of the polygon mirror 4 serving as the light deflector are made incident upon the scanning lens with an angle of incidence in the sub-scanning direction with respect to the plane normal to the deflecting surface of the polygon mirror 4. This angle of incidence allows a significant reduction in the height h of the polygon mirror 4 as shown in FIG. 4C, and allows formation of the polyhedron that constitutes the deflecting surfaces of the polygon mirror 4 to be in a single tier, as described with respect to the counter scanning system. Moreover, as the thickness of the polygon mirror 4 in the sub-scanning direction is reduced, the rotational inertia can be reduced and the start-up time thereof can also be shortened. In addition, the cost can be reduced in comparison with the two-tiers polygon mirror 4 in the conventional counter scanning system.

In order to make the oblique incidence angle as small as possible in the one-side scanning system, it is preferable to combine the concepts of the horizontal incidence system and oblique incidence system. More specifically, as shown in FIG. 4A, two light beams that constitute a pair are symmetrically and obliquely made incident with respect to the plane normal to the deflecting surface, and two such pairs are made incident upon the deflecting surface, parallel to each other. Such combination of the horizontal incidence and the oblique incidence allows the dimensions of the polygon mirror 4 to be reduced in comparison with the conventional horizontal incidence system. However, the arrangement as shown in FIG. 4C is the most effective in making the polygon mirror 4 smaller in dimension, and hence in the solution of the previously discussed problems.

Further, regarding the system in which the light beams are made incident at an oblique angle in the sub-scanning direction, it is known as described above, that such light beams lead to an increase in aberrations and hence to degradation in optical performance, unlike the conventional horizontal incidence system. Accordingly, the present invention employs a special surface to be described later, to thereby correct for the degradation in optical performance. In particular, reducing the angle of incidence with respect to the plane normal to the deflecting surface of the polygon mirror (the angle in the sub-scanning direction at which the light beam is obliquely made incident) allows minimizing the degradation in optical performance, thus achieving an excellent optical performance. Consequently, an appropriate beam spot diameter can be stably obtained, so that the quality of the formed image can be upgraded because of the finer beam spot diameter.

In the system in which the light beams are made incident at an oblique angle instead of the conventional horizontal incidence, a larger scanning line curvature is incurred. The amount of curvature in the scanning line differs depending on the particular oblique angle of incidence in the sub-scanning direction with respect to each light beam. Such a difference is visualized upon the developing of the latent image that is drawn by each light beam with a toner of the corresponding color, thus resulting in color deviation when the toner images are stacked. Moreover, because of the oblique angle of incidence the light beam is twisted when made incident in the scanning lens, which increases the wavefront aberration, thereby significantly degrading the optical performance especially at peripheral field height and thus increasing the beam spot diameter. This obviously inhibits achieving a higher image quality. The following describes the emergence of the wavefront aberration and the scanning line curvature relevant to the oblique incidence optical system.

First, the emergence of the scanning line curvature will be described. The distance from the deflecting surface of the light deflector to the incidence surface of the scanning lens 22 differs depending on the lens height unless, for example, the scanning lens constituting the scanning optical system, especially, the scanning lens that has a large refracting power in the sub-scanning direction (e.g., the second scanning lens 22 in FIG. 1), has an arcuate incidence surface in the main scanning direction with its center disposed at the reflecting point on the deflecting surface. However, it is difficult to actually form the scanning lens in such a shape from the viewpoint of maintaining the optical performance level. Accordingly, as shown in FIG. 1, an ordinary light beam, upon being deflect-scanned by the light deflector, is not made perpendicularly incident upon the lens surface at each field height in a cross-section in the main scanning direction, but is instead made incident with a certain angle of incidence in the main scanning direction.

Because of the oblique incidence of the light beam with respect to the deflecting surface of the light deflector (i.e., incidence with an angle in the sub-scanning direction), the distances of the light beams deflected by the light deflector, between the deflecting surface of the light deflector and the incidence surface of the scanning lens are different depending on the field height. The light beam closer to the periphery of the field height is made incident at a higher or a lower position (in the sub-scanning direction) from the center on the scanning lens. The height of the incidence position on the scanning lens depends on the angle in the sub-scanning direction given to the respective light beams. Accordingly, the light beams are subjected to different refracting powers in the sub-scanning direction when passing through the plane having a large refracting power in the sub-scanning direction, thereby incurring curvature in the scanning line. In the case of the conventional horizontal incidence, since the light beams travel in parallel toward the scanning lens, the incidence position in the sub scanning direction on the scanning lens is not shifted, even though the distance from the deflecting surface to the incidence surface of the scanning lens is different, and the scanning line is kept from being curved.

Next, the wavefront aberration due to the oblique incidence of the light beam upon the deflecting surface will be described. As described earlier, the distance from the deflecting surface of the light deflector to the incidence surface of the scanning lens is different depending on the field height, unless the scanning lens constituting the scanning optical system has an arcuate incidence surface in the main scanning direction with its center disposed at the reflecting point of the light beam on the deflecting surface. However, it is difficult to actually form the scanning lens in such a shape from the viewpoint of maintaining the optical performance level. Accordingly, an ordinary light beam, upon being deflect-scanned by the light deflector, is not perpendicularly made incident upon the lens surface at each field height in a cross-section in the main scanning direction, but is made incident with a certain incident angle in the main scanning direction. The light beam that has been deflected by the light deflector has a certain width in the main scanning direction, and both edges in one light beam in the main scanning direction are twisted when made incident in the scanning lens, because the distance from the deflecting surface of the light deflector to the incidence surface of the scanning lens is different and inclined in the sub-scanning direction (because of the oblique angle of incidence). This causes significant degradation due to wavefront aberration, thereby increasing the beam spot diameter. As shown in FIG. 1, as the incidence angle in the main scanning direction becomes steeper at a farther peripheral field height, the greater the distortion of the light beam becomes. Therefore, the beam spot diameter due to the degradation in wavefront aberration becomes larger at a position closer to the periphery of the field height.

The scanning optical system in the optical scanner according to the first embodiment employs a special surface for correcting for both the wavefront aberration and the scanning line curvature that occur in an oblique incidence system. The correction of the wavefront aberration and the scanning line curvature can be performed by tilt-decentration of the lens surface in the sub-scanning direction. The scanning position in the sub-scanning direction at different field heights and the degradation amount of the wavefront aberration are equilibrated so as to correct the scanning position and the wavefront aberration at each field height, thereby correcting the scanning line curvature on the scanning surface and the increased beam spot diameter due to the increased wavefront aberration.

Figure 16A:
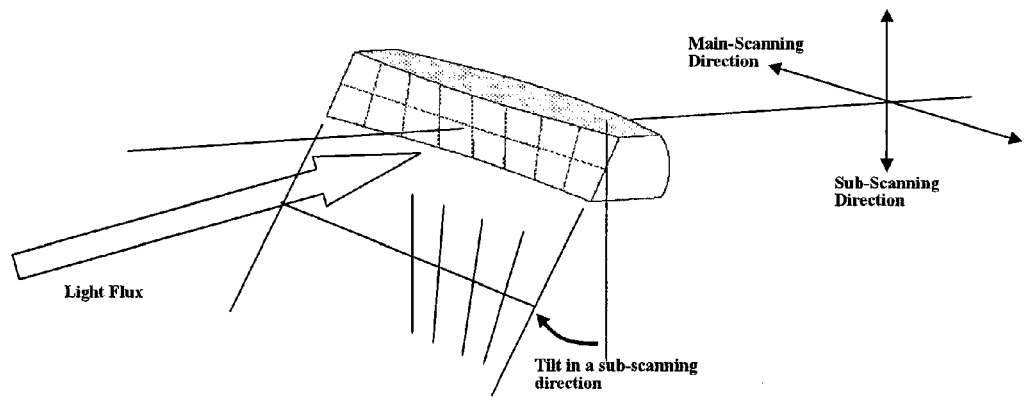
FIG. 16A is an illustration of a portion of the special surface of a lens, showing the characteristics of the special surface according to embodiments of the present invention.
Figure 16B:
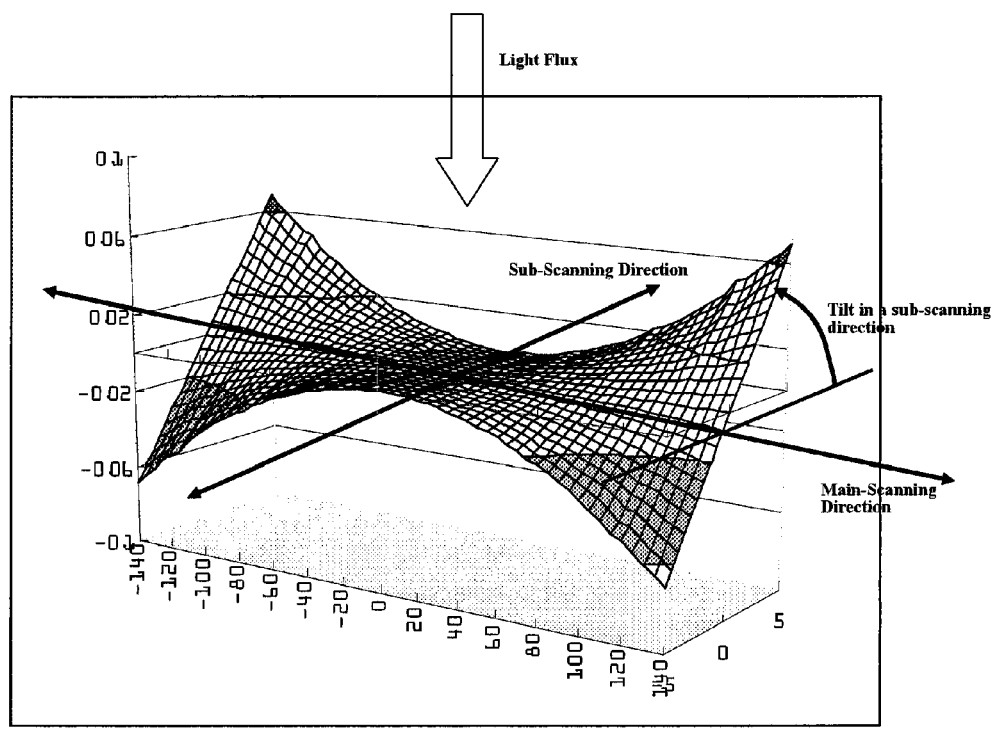
FIG. 16B is an exaggerated view of the lens surface of FIG. 16A.

However, the wavefront aberration and the scanning line curvature cannot be completely corrected, since the amount of increased wavefront aberration due to the distortion (skew) of the light beam made incident upon the lens surface, the shift of object points in the sub-scanning direction among the field heights due to the oblique incidence upon the deflecting surface of the light deflector, and the distance from the deflecting surface to the lens surface are different at each field point. Accordingly, the present invention forms at least one surface of the scanning lens as a special surface having a flat shape without a curvature in the sub-scanning direction, and having different decentration angles (tilting amount) in the widthwise direction of the lens (sub-scanning direction) according to a height of the lens in the lengthwise direction of the lens (in the main scanning direction), to thereby correct the wavefront aberration and the scanning line curvature. The special surface of the lens is illustrated in FIGS. 16A and 16B. The decentration angle (tilting amount) of the special surface means the tilting angle of the optical element in the widthwise direction on the optical plane. When the tilting amount is zero, the lens is not inclined at all, i.e., it has the same status as an ordinary lens.

The special surface will now be described in further detail. The specific shape of the special surface may be formed according to Formula (1), shown below. It should be noted, however, that the present invention is not limited to this formula, and that the same surface profile may be defined by a different formula. In Formula (1), RY represents a paraxial curvature radius in the "cross-section in the main scanning direction," which is a transverse cross-section including the optical axis and parallel to the main scanning direction; Y represents a distance in the main scanning direction from the optical axis; A, B, C, D, etc., are high order coefficients; and RZ represents a paraxial curvature radius of the "cross-section in the sub-scanning direction" orthogonal to the cross-section in the main scanning direction.

$$(Y, Z) = \frac{Y^2 \cdot Cm}{1 + \sqrt{[1 - (1 + K) \cdot (Y \cdot Cm)^2]}} + A \cdot Y^4 + B \cdot Y^6 + \quad (1)$$
$$C \cdot Y^8 + D \cdot Y^{10} + E \cdot Y^{12} \ldots +$$
$$\frac{Cs(Y) \cdot Z^2}{1 + \sqrt{[1 - (Cs(Y) \cdot Z)^2]}} +$$
$$(F0 + F1 \cdot Y + F2 \cdot Y^2 + F3 \cdot Y^3 + F4 \cdot Y^4 + \ldots)Z$$

where $Cm=1/RY$, $Cs(Y)=1/RZ$. $(F0+F1\cdot Y+F2\cdot Y^2+F3\cdot YA3+F4\cdot Y^4+\ldots)Z$ represents the tilting amount. Thus, when the lens surface is not tilted, F0, F1, F2, etc. are all zero. When F0, F1, F2, etc. are not zero, the tilting amount of the lens surface varies in the main scanning direction.

Further, the reason that the special surface is formed in a flat shape without a radius of curvature in the sub-scanning direction will now be described. In the case where a radius of curvature is given in the sub-scanning direction, the shape in the main scanning direction is significantly varied at each height in the sub-scanning direction, by which fluctuation of magnification error is amplified by a change in temperature or by an assembly error of the optical elements that causes the incoming position of the light beam to shift in the sub-scanning direction. In a color image forming apparatus that overlays images of each color to form a colored image, this increase in fluctuation of magnification error results in a positional shift of the beam spot between different colors, thus causing color deviation. Thus, it is desirable to form the special surface in a flat shape without a radius of curvature in the sub-scanning direction, as in the present invention. Such a configuration allows the shape error in the main scanning direction at each height in the sub-scanning direction to be minimized, thereby minimizing the fluctuation of magnification error incurred by the positional shift of the light beam incidence in the sub-scanning direction and suppressing the color deviation.

In practice, the shape in the main scanning direction may change according to the height in the sub-scanning direction even when the special surface of the present invention is employed, however, this change is very slight and such a change can be sufficiently minimized in comparison with the case where the lens surface has a curvature in the sub-scanning direction. Consequently, the special surface of the present invention can effectively minimize the amplitude of the fluctuation of magnification error among the light beams that is caused by uneven temperature distribution. The special surface may also minimize the color deviation at an intermediate field height incurred when the positions to start writing and positions to finish writing are set to respectively coincide with the light beams by synchronization.

Figure 5A:
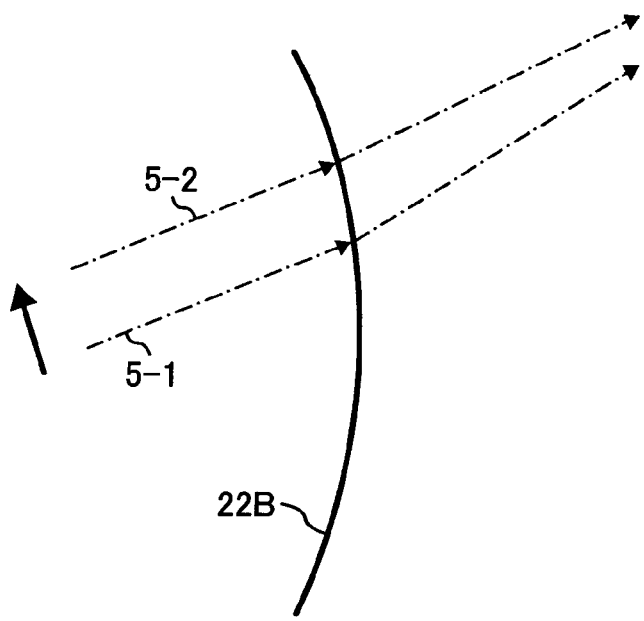
FIGS. 5A and 5B are schematics showing the effect of a special surface applicable to an embodiment of the invention.
Figure 5B:
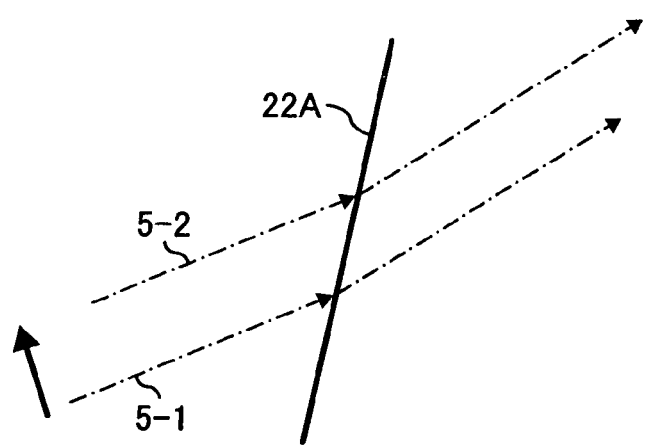

FIG. 5B illustrates a path of an outgoing beam through a special surface 22A that does not have a refracting power (i.e., a surface without a radius of curvature in the sub-scanning direction), when an incoming beam 5-1 is shifted in the sub-scanning direction as indicated by 5-2. As shown therein, when the incoming beam is shifted in the sub-scanning direction, the traveling direction of the light beam is only slightly shifted and the change in the traveling direction is small, since the special surface does not have a refracting power. FIG. 5A illustrates a path of an outgoing beam through a surface 22B that has a refracting power in the sub-scanning direction, i.e., a curvature, when an incoming beam 5-1 is shifted in the sub-scanning direction as indicated by 5-2. When the incoming beam is shifted in the sub-scanning direction through the surface 22B (that has a curvature in the sub-scanning direction), the light beam changes its traveling direction as shown in FIG. 5A, because of the change in refracting power applied thereto. When the amount of such a change in the traveling direction of the light beam is different at each field height, the scanning lines are significantly curved. This also causes a skew of the light beam, which leads to increased wavefront aberration and beam spot diameter, that is, fluctuation or increase in diameter. This is why the shape of the special surface in the sub-scanning direction has to be flat, without a curvature.

According to the present invention, adopting the special flat surface and appropriately imparting the scanning lens with different tilting amounts in the main scanning direction allows for correction of the skew in the light beam. Likewise, regarding the scanning line curvature, adopting the special surface and appropriately imparting the scanning lens with different tilting amounts in the main scanning direction allows for correction of the position of the light beam directed to each field height in the sub-scanning direction, thus correcting the scanning line curvature.

Also, the increased wavefront aberration caused by the light beam made incident with an angle in the sub-scanning direction upon the incidence surface of the scanning lens is extremely rare, because the skew of the light beam barely takes place with respect to the scanning lens in the vicinity of the optical axis. Accordingly, in the special surface employed in the present invention, the decentration on the optical axis may be set as zero. Conventionally, when correcting for wavefront aberration or scanning line curvature by tilt-decentration or shift-decentration of the lens or lens surface, the lens performance in the vicinity of a central field height is intentionally degraded thus to equilibrate with the performance at a periphery of the field height. According to the present invention, however, adopting the special surface eliminates the need to decenter the lens or lens surface, thereby achieving a higher level correction of the optical performance.

Designing the special surface so as to fit each individual light beam directed to a different scanning surface (i.e., all light beams having different angles in the sub-scanning direction (oblique incidence angle) with respect to the normal of the reflecting surface of the light deflector), allows for the performance of excellent correction of the wavefront aberration and the scanning line curvature with respect to all light beams. In this case, even though the oblique incidence angles are different, employing the special surface and modifying the coefficient of the formula allows optimal design of the special surface which leads to effective corrections.

Further, as shown in FIG. 1, disposing a mirror 24 so as to bend the path such that the light beam is made incident upon the polygon mirror 4 with an angle in the main scanning direction, thus to avoid the interference by the scanning lens 21, allows setting a small incidence angle in the sub-scanning direction. A larger incidence angle in the sub-scanning direction leads to greater degradation in optical performance, thus making it difficult to perform reasonable correction. Accordingly, it is desirable to make the light beam incident upon the deflecting surface of the polygon mirror 4 with an angle in the main scanning direction.

For effectively performing the correction of the wavefront aberration and the scanning line curvature, it is desirable to employ at least two scanning lenses, both of which include the special surface. Here, imparting different functions to the respective lenses, such as correcting for wavefront aberration with the special surface of the scanning lens closer to the light deflector (the scanning lens closer to the light deflector side than the scanning lens so that at least it has a strong refracting power in the sub-scanning direction) and correcting for scanning line curvature with the special surface of the scanning lens closer to the scanning surface (the scanning lens that has the strong refracting power in the sub-scanning direction), allows for making the beam spot diameter even finer, with a further reduction of the scanning line curvature. Obviously, these functions do not have to be strictly separated, but the respective special surfaces can take the part of the correction of wavefront aberration and scanning line curvature.

Figure 6:
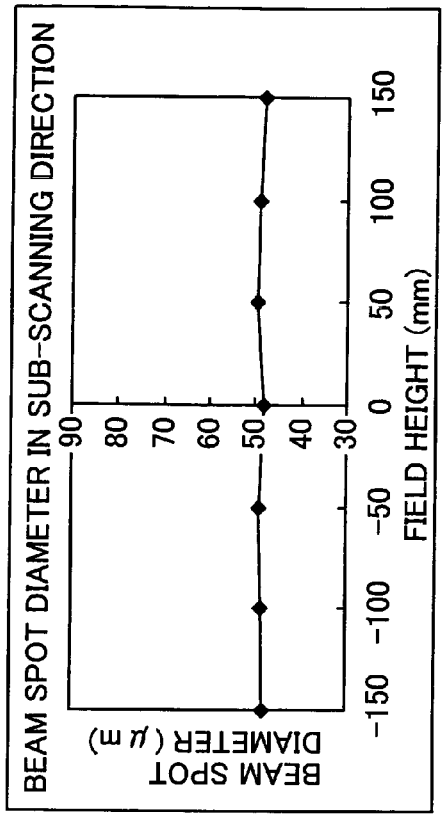
FIG. 6 is a set of charts showing beam spot diameters before and after wavefront aberration with the special surface provided in a scanning lens according to an embodiment of the invention.
Figure 6:
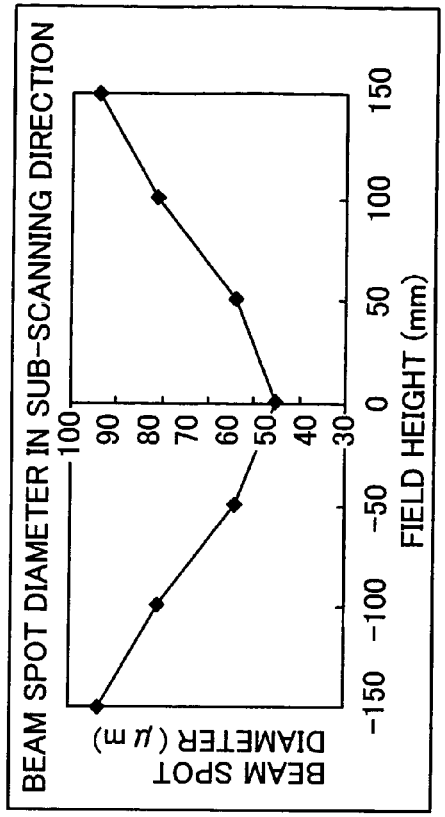
Figure 6:
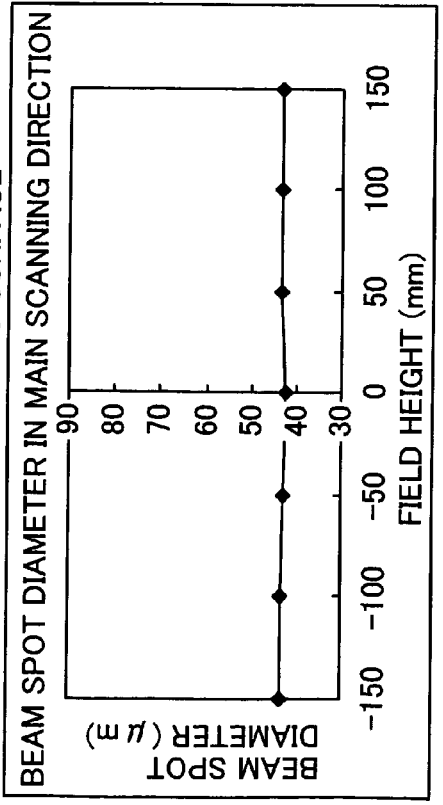
Figure 6:
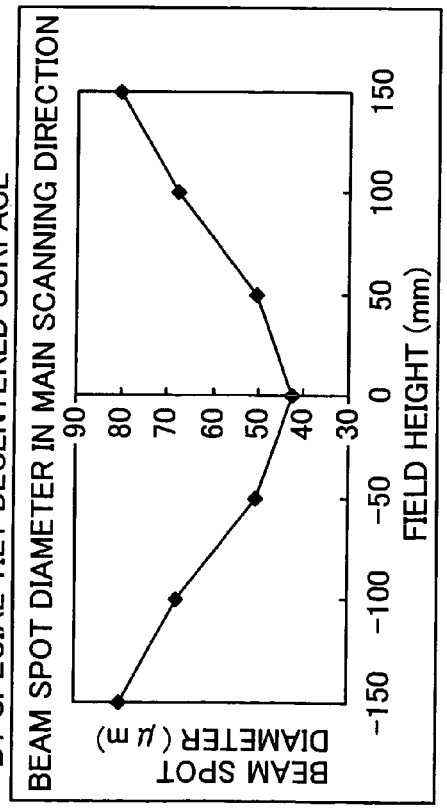

The correction of the wavefront aberration according to a second embodiment of the present invention will now be described. As described above, the incidence angle upon the scanning lens in the main scanning direction is steeper (greater) at a position closer to the periphery of the field height, where the skew of the light beam becomes greater and the beam spot diameter due to the degradation in wavefront aberration becomes larger. Accordingly, it is desirable to form the shape of the special surface employed in the scanning optical system of the optical scanner according to the present invention such that the decentration amount increases at a position more distant from the optical axis in the main scanning direction. Since the light beam in the vicinity of the optical axis, i.e., in the vicinity of the central field height is generally perpendicularly made incident upon the lens surface, the degradation in wavefront aberration due to an incidence angle of the light beam in the sub-scanning direction is only slight. This is apparent in FIG. 6B which shows exemplary beam spot diameter data before the correction of the wavefront aberration. Therefore, increasing the decentration amount in positions farther from the optical axis in the main scanning direction so as to correct for increased wavefront aberration due to the skew of the light beam allows achieving excellent optical performance with an appropriate beam spot diameter.

Figure 7:
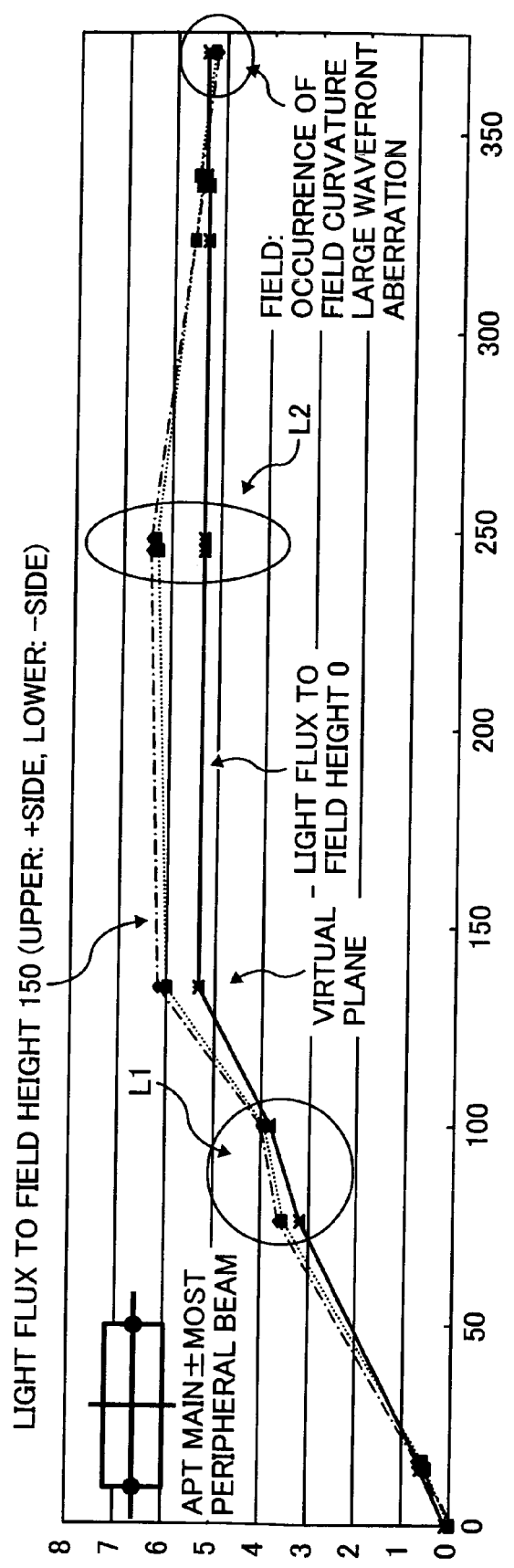
FIG. 7 is a schematic showing the light path of the light beams on a cross-section in the sub-scanning direction by a conventional oblique incidence system that does not employing the special surface.

The increased wavefront aberration more prominently takes place when the light beam is twisted when made incident to the scanning lens that has a strong refracting power in the sub-scanning direction. FIG. 7 shows light beams on a cross-section in the sub-scanning direction, when the light beams are made incident at an oblique angle in a conventional scanning optical system without employing the special surface. The horizontal axis of FIG. 7 represents the field height in the main scanning direction from the optical axis, and the vertical axis represents the light beam height in the sub-scanning direction. Two light beams are shown in FIG. 7; one for the center in the sub-scanning direction of an aperture disposed posterior to pass through the coupling lens, and another for both edges in the main scanning direction. The lens that has the strongest refracting power in the sub-scanning direction is the second scanning lens L2 in FIG. 7, while the second scanning lens L1 has a refracting power that is substantially zero. A virtual plane in FIG. 7 is a mirror surface that does not actually exist, which only serves to place a third scanning lens L2 at a horizontal level with the second scanning lens L1.

As is apparent from FIG. 7, the light beams reflected by the polygon mirror 4 are made incident upon the scanning lens at different heights in the sub-scanning direction. In the central field height, since the respective light beams are generally made incident perpendicular to the scanning lens, the light beams are made incident upon the scanning lens without a difference in height in the sub-scanning direction. Accordingly, the wavefront aberration is not increased and appropriate beam spot diameters can be maintained. On the other hand, in the peripheral field height (the light beam that reaches the position of +150 millimeter on the scanning surface), the light beams are made incident at different heights, because of the difference of the optical path length from the polygon mirror 4 to the scanning lens. Therefore, the respective light beams are not concentrated on one position on the scanning surface, that is, the wavefront aberration and the beam spot diameter are increased.

Also, as can be seen in FIG. 7, the light beam directed to the field height 0 on the scanning surface and the light beam directed to the field height +150 are not aligned. This means the emergence of the scanning line curvature, caused by the difference in optical path length up to the second scanning lens L2 (which has the strong refracting power in the sub-scanning direction), by which the light beam directed to the peripheral field height is made incident at a higher level in the sub-scanning direction from the optical axis of the second scanning lens L2, than the light beam directed to the central field height. Also, the "sag" incurred by the polygon mirror shifts the reflecting point in the sub-scanning direction. For correcting the wavefront aberration, it is necessary to correct the incidence height upon the second scanning lens L2, so that the light beams are concentrated in a single point on the scanning surface. Accordingly, it is more desirable that the special surface employed for the wavefront aberration correction is provided on the first scanning lens (closer to the light deflector) than on the second scanning lens.

Figure 8:
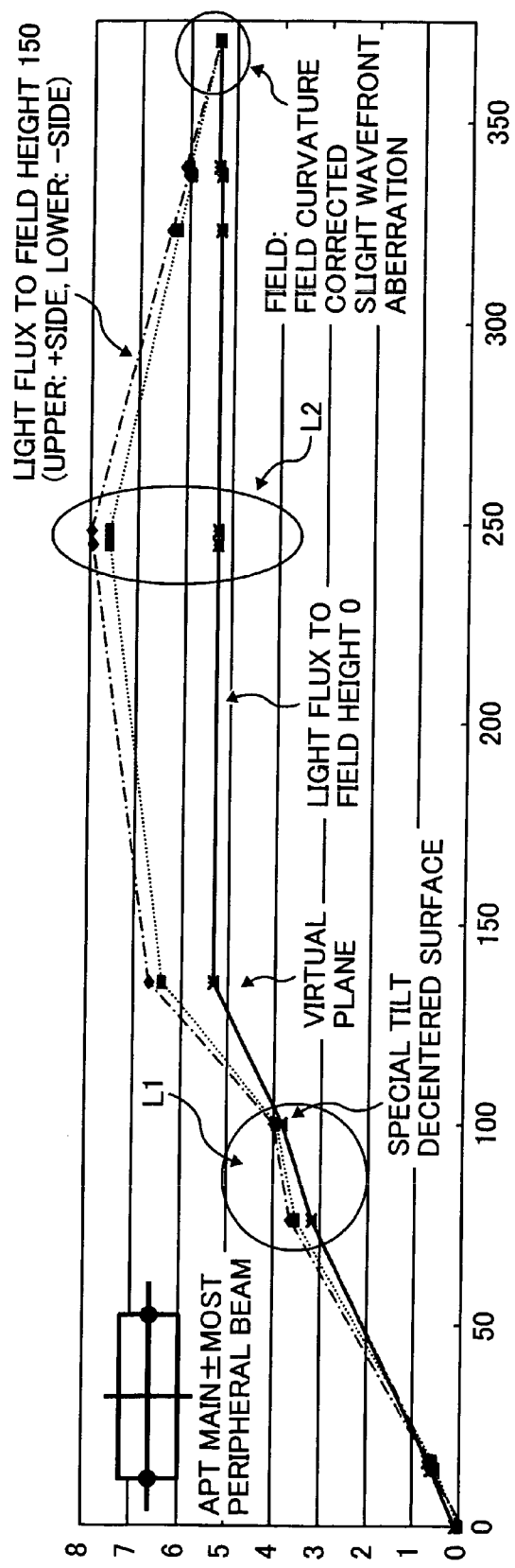
FIG. 8 is a schematic showing the light path of the light beams on a cross-section in the sub-scanning direction after correction of wavefront aberration and scanning line curvature by the special surface.

FIG. 8 is, in the same manner as FIG. 7, a light path diagram after correction of the wavefront aberration and the scanning line curvature by the special surface in accordance with the present invention. The special surface is provided on a second surface of the first scanning lens L1, for the correction of the wavefront aberration. The incidence height upon the second scanning lens L2 is made higher, and the light beam on both edges in the main scanning direction is also made incident in the sub-scanning direction at a higher level in a position closer to the periphery of the field height, upon the second scanning lens L2. Normally it is difficult to form the surface of the scanning lens so as to constitute concentric circles in the main scanning direction about the reflective deflection point on the polygon mirror, without affecting the desired optical performance. Accordingly, the light beams deflected by the polygon mirror 4 are made incident upon the scanning lens at a higher position in a farther peripheral field height, so as to define a larger angle in the sub-scanning direction with respect to the plane normal to the deflecting surface of the light deflector. That is, as shown in the light path diagram of FIG. 13, when the light beam is directed upward by the deflecting surface, in the incident surface of the scanning lens, the higher the light beams made incident on the incidence surface in peripheral field height, the further the light beams pass through the upper scanning lens. In the example of FIG. 8, provided that the light beam at the field height 0 through the second scanning lens L2 corresponds to the optical axis, the light beam passes through the plus region of the height along the sub-scanning direction, in the field height of +150.

When correcting the wavefront aberration with the special surface, it is desirable to make the light beams incident upon the second scanning lens L2 at higher positions, and also to make the light beams on both edges in the main scanning direction incident at a higher position in a farther peripheral field height upon the second scanning lens L2. Such arrangement enables the special surface to correct the wavefront aberration. That is, a special tilting surface is formed on the first scanning lens than the second scanning lens L2, such that the light beams inclined in the sub-scanning direction with respect to the plane normal to the deflecting surface of the light deflector define larger angles with respect to the same normal plane at farther peripheral field height. Then adjusting the incidence position in the sub-scanning direction on the second scanning lens L2 allows correction of the wavefront aberration.

Further, the correction of the scanning line curvature will now be described. The description on the emergence of the scanning line curvature has already been given, and is hence omitted here. According to the second embodiment, the scanning lens is provided with the special surface, so as to correct the image point position along the main scanning direction (i.e., each field height) in the sub-scanning direction, to thereby correct the scanning line curvature. In such a configuration, in order to make the oblique incidence angle smaller to suppress the scanning line curvature and wavefront aberration, the light beam is made incident upon the deflecting surface of the polygon mirror 4 with an angle in the main scanning direction so as to avoid interference with the scanning lens, as described above. As a result, the optical sag incurred by the polygon mirror becomes asymmetric left and right with respect to the center (optical axis of the scanning lens). That is, since the difference in optical path length that is a cause of the scanning line curvature is not symmetric left and right with respect to the center, the scanning line curvature also asymmetrically appears left and right.

Accordingly, employing a special surface having asymmetrically different decentration amounts in the main scanning direction with respect to the optical axis allows for effective correction of the scanning line curvature. Also, it is desirable to apply such a special surface to the scanning lens that is closest to the scanning surface. The diameter of the light beam becomes smaller as the light beam comes closer to the scanning surface. Therefore, changing the traveling direction of the light beam for correcting the scanning line curvature does not largely affect the inner structure of the light beam, and hence the state achieved upon correcting the wavefront aberration with the special surface of the scanning lens closer to the light deflector can be maintained free from degradation. That is, the light beam after the correction of the wavefront aberration is not largely skewed, and the wavefront is not degraded. Thus, it is effective to perform the wavefront aberration correction with the scanning lens closer to the light deflector, and having a large light beam diameter and the traveling direction of the light beams in the light beam is easy to correct.

Further, at the scanning lens closer to the scanning surface, the light beams directed to each field height are more clearly split, and the adjacent beams are only slightly overlapping. This allows for setting the decentration amount of the special surface in detail, to thereby effectively correct for the scanning line curvature. In addition, regarding the statement on the correction of the scanning line curvature by the special surface having asymmetrically different decentration amounts in the main scanning direction, that it is desirable to provide such a special surface on the scanning lens closest to the scanning surface. It should be noted that the correction of the wavefront aberration the skew amount is asymmetric. Providing another scanning lens (other than the scanning lens closest to the scanning surface) with the special surface having asymmetrically different decentration amounts in the main scanning direction can also correct the aberrations with respect to the asymmetry in skew, though not as effectively as with the asymmetry in the scanning line curvature.

Figure 9:
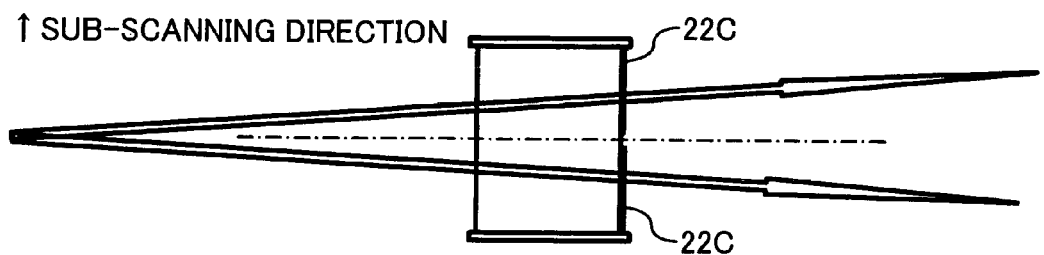
FIG. 9 is a light path diagram showing an example in which a scanning lens is shared by a plurality of light beams emitted by a plurality of light source units.

A third embodiment will now be explained with reference to FIG. 9. Referring now to FIG. 9, it is desirable that at least the scanning lens closest to the light deflector is shared by a plurality of light beams emitted by a plurality of light source units. In FIG. 9, numeral 22C represents the special surface of the scanning lens. Forming a lens to be integrally shared allows a reduction in the number of parts and suppresses the quality fluctuation among individual parts. In a one-side scanning type optical scanner employed in a color image forming apparatus, for example, employing a single lens compatible with cyan, magenta, yellow and black, for shared use by all light beams directed to the photoconductor, which corresponds to the scanning surface, can significantly reduce the number of scanning lenses. Also, in a counter scanning type color optical scanner, sharing a single scanning lens between light beams of two colors can reduce the number of scanning lenses.

In a case where the scanning lens is not shared by a plurality of light beams, the scanning lenses, respectively correspond to the light beams from different light source units (i.e., the light beams directed to different photoconductors have to be provided), so as to be aligned in the sub-scanning direction. In the counter scanning system, the deflecting surface has to have at least two tiers, and has to have four tiers in the one-side scanning system. Moreover, the scanning lenses have to be provided with a rib outside the effective region of the lens surface corresponding to the light beams, by which the spacing between adjacent light beams aligned in the sub-scanning direction is widened thus to increase the oblique incidence angle, resulting in a degradation in optical performance. In order to widen the interval between adjacent light beams without increasing the oblique incidence angle, the scanning lens has to be disposed farther from the light deflector. In the main scanning direction in particular, the refracting power has to be increased and hence the scanning lens becomes thicker, thus leading to an increase in dimensions of the scanning lens and in manufacturing cost. Moreover, a bonding step for fixing the stacked lenses has to be additionally introduced, and also strict positioning has to be performed for each of the lenses, which further complicates the assembly step.

According to the third embodiment, sharing at least the scanning lens closest to the light deflector by the light beams from a plurality of light source units solves these problems, and further allows for a reduction in the height of the scanning lens in the sub-scanning direction and in the oblique incidence angle, as well as solving the issues of the bonding step for stacked lenses and positioning step in the assembly step. Also, it is desirable that the scanning lens has a surface profile that is mirror-symmetric with respect to a plane parallel to the normal of the deflecting surface of the polygon mirror and including the center in the sub-scanning direction of the light beams reflected by the polygon mirror. Forming the special surface in a mirror symmetric shape, by making the light beams symmetrically incident upon the plane parallel to the normal of the deflecting surface of the polygon mirror and including the center in the sub-scanning direction of the light beams reflected by the polygon mirror, enables improvement of the design efficiency. Also, forming the lens in a symmetric shape in the main scanning direction allows utilization of the same lens in inversed orientations. The "mirror symmetry" hereinafter referred to means the symmetry with respect to a plane parallel to the normal of the deflecting surface of the polygon mirror and including the center in the sub-scanning direction of the light beams reflected by the polygon mirror, on the assumption that all the mirrors posterior to the deflection by the polygon mirror are omitted.

Figure 10:
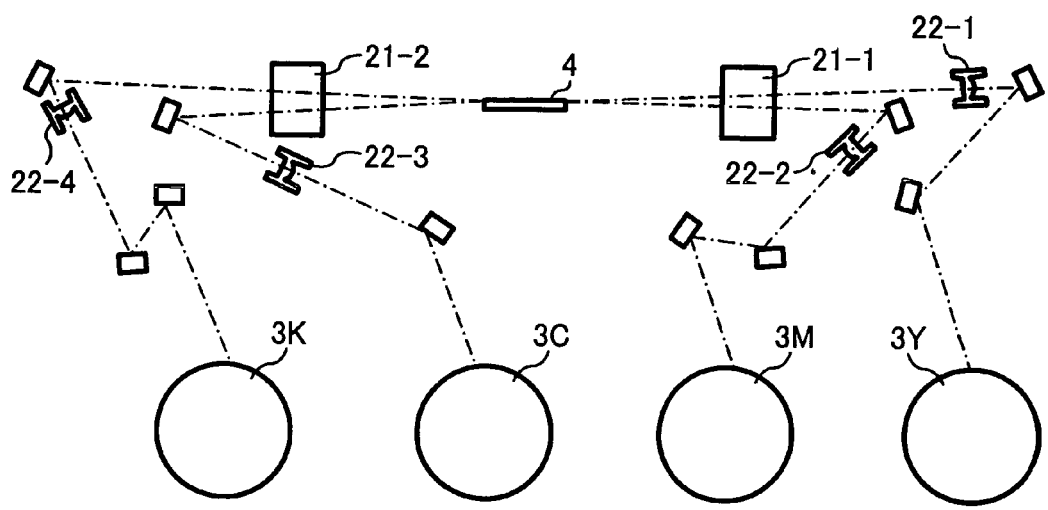
FIG. 10 is an optical diagram schematically showing an optical scanner according to a fourth embodiment of the present invention.

FIG. 10 is an example showing scanning lenses described above which are applied to the counter scanning type optical scanner, as a fourth embodiment of the present invention. In FIG. 10, numeral 4 represents a polygon mirror, 21-1 and 21-2 first scanning lenses, 22-1 to 22-4 second scanning lenses, 3Y a photosensitive drum for yellow, 3M a photosensitive drum for magenta, 3C a photosensitive drum for cyan, and 3K a photosensitive drum for black. The first scanning lenses 21-1 and 21-2 are disposed on both sides of the polygon mirror 4, and each of lenses 21-1 and 21-2 is to be shared by two light beams. Optical elements are disposed such that each of the light beams are transmitted through the corresponding second scanning lenses 22-1 to 22-4 respectively and the light paths of these are bent by appropriately disposed mirrors, so that the light beams reach the corresponding photosensitive drums 3Y, 3M, 3C and 3K. It is well-known that upon scanning by a beam spot on the corresponding photosensitive drums 3Y, 3M, 3C and 3K electrostatic latent images corresponding to the respective colors are formed. These images are then developed by a toner for the corresponding color and transferred on overlaid transfer paper, thus to obtain a printed color image.

Further, for effectively correcting the field curvature in the sub-scanning direction, it is desirable to include at least one surface for which the curvature varies in the sub-scanning direction according to the field height, in the scanning optical system.

The "special surface" previously discussed is a surface without a curvature in the sub-scanning direction, and hence does not provide the function of condensing the light in the sub-scanning direction. Accordingly, a surface for which the curvature varies in the sub-scanning direction according to the field height (hereinafter, "special toroidal surface") is employed. This allows effective correction of the field curvature at each field height, without increasing the number of lenses, even when a plurality of special surfaces are employed for correction of the wavefront aberration and the scanning line curvature.

The shape of the special toroidal surface may be formed according to Formula (2) given below. It should be noted, however, that the special toroidal surface profile is not limited to that in Formula (2), and that the surface profile may be defined by a different formula. In the formula, RY represents a paraxial curvature radius in the "cross-section in the main scanning direction," which is a transverse cross-section including the optical axis and parallel to the main scanning direction; Y represents a distance in the main scanning direction from the optical axis; A, B, C, D, etc., are high order coefficients; and RZ represents a paraxial curvature radius of the "cross-section in the sub-scanning direction" orthogonal to the cross-section in the main scanning direction.

$$X(Y, Z) = \frac{Y^2 \cdot Cm}{1 + \sqrt{[1 - (1 + K) \cdot (Y \cdot Cm)^2]}} + \quad (2)$$
$$A \cdot Y^4 + B \cdot Y^6 +$$
$$C \cdot Y^8 + D \cdot Y^{10} + E \cdot Y^{12} \ldots +$$
$$\frac{Cs(Y) \cdot Z^2}{1 + \sqrt{[1 - (Cs(Y) \cdot Z)^2]}}$$

wherein, $Cm=1/RY$, and $Cs(Y)=1/RZ+aY+bY^2+cY^3+dY^4+eY^5+fY^6+gY^7+hY^8+iY^9+jY^{10}\ldots$ According to a numerical example of the present, invention to be subsequently described, employing the special tilting surface (two surfaces) and the special toroidal surface (one) in the scanning lens unit, it is shown that having a reduced number of scanning lens elements (including only two) can achieve excellent optical performance in the correction of the field curvature, scanning line curvature and wavefront aberration.

The "optical axis" hereinafter referred to means a line connecting the centers of the respective surfaces, or alternatively, a line connecting the origin points of a formula when the surfaces are defined by a formula.

Figure 11A:
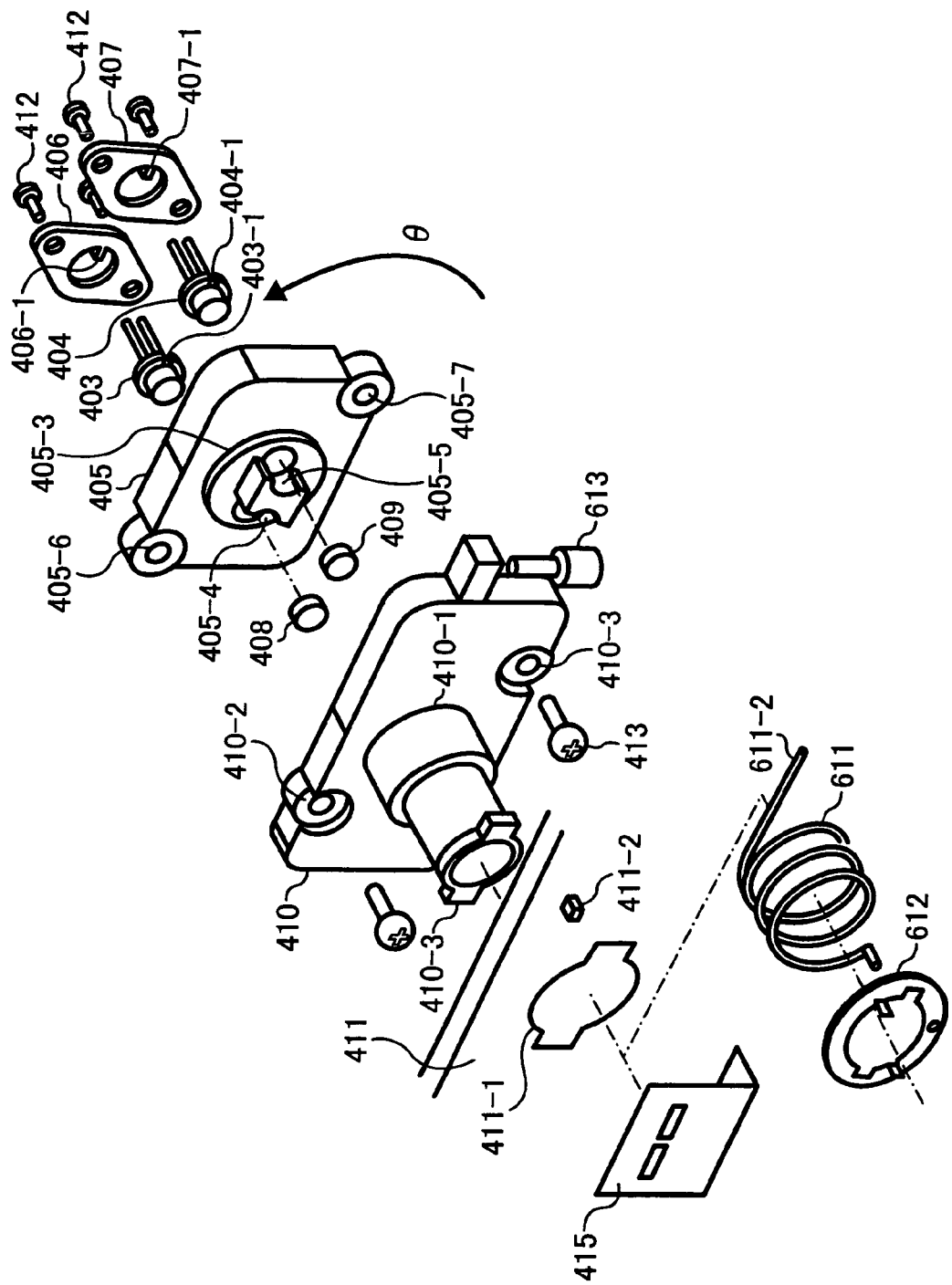
Figure 11C:
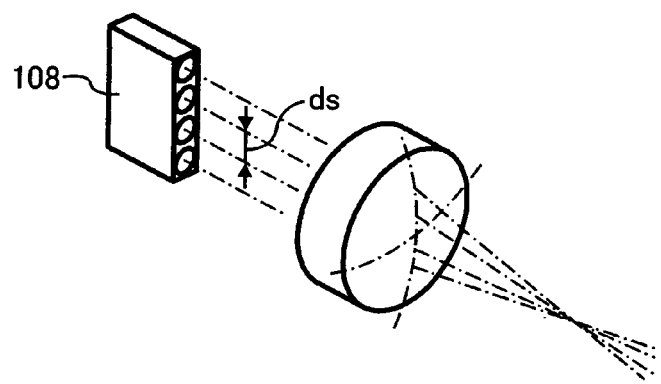

As a fifth embodiment, an optical scanner is provided with a multibeam light source unit. FIGS. 11A to 11C illustrate examples of multibeam light source units, each of which is described in more detail below. The multibeam source unit includes a semiconductor laser array having a plurality of emission points or a plurality of light sources having a single emission point or a plurality of emission points, so as to simultaneously scan the photoconductor surfaces with a plurality of light beams. This allows a high-speed and high-density optical scanner and image forming apparatus to be achieved. When forming such optical scanner or image forming apparatus, the advantages can equally be obtained.

In FIG. 11A, semiconductor lasers 403 and 404 are individually fitted into a fitting hole (not shown) disposed behind a base plate 405. The fitting holes are slightly inclined by a predetermined angle (approximately 1.5 degrees) in the main scanning direction, and hence the semiconductor lasers 403 and 404 fitted thereinto are also inclined by approximately 1.5 degrees in the main scanning direction. The semiconductor lasers 403 and 404 are provided with a cutaway portion at cylindrical heatsink portions 403-1 and 404-1, so that the emission sources are aligned by engaging projections 406-1 and 407-1 formed in a circular hole at the center of fastening plates 406 and 407 with the cutaway portion of the heatsink portion. The fastening plates 406 and 407 are attached to the rear face of the base plate 405 with screws 412, so as to fix the semiconductor lasers 403 and 404 to the base plate 405. Collimate lenses 408 and 409 are attached to the base plate 405 with an outer circumferential surface thereof slidably engaged with semicircular fitting guide faces 405-4 and 405-5, respectively, for positional adjustment in a direction of the optical axis so as to convert the beam emitted from the emission points into a parallel beam, and then bonded upon completing the positioning.

In the fifth embodiment, since the beams of light from the semiconductor lasers are set to intersect each other in the main scanning plane, the fitting holes in which the semiconductor lasers 403 and 404 are fitted along the beam of light direction and the semicircular fitting guide faces 405-4 and 405-5 are formed with an inclination. A cylindrical engaging portion 405-3 of the base plate 405 is engaged with a holder plate 410, and screws 413 are screw-fitted with threaded holes 405-6 and 405-7 via a through hole 410-2, so that the base plate 405 is fixed to the holder plate 410, thus to form the light source unit.

The holder plate 410 of the light source unit is fitted to a reference hole 411-1 on a mounting wall 411 of an optical housing, via a cylindrical portion 410-1. A spring 611 is inserted from the front side of the mounting wall 411 and then a stopper 612 is engaged with the cylindrical projection 410-3, so that the holder plate 410 is closely retained to the rear face of the mounting wall 411. The light source unit is thus retained. Then, an edge of the spring 611 is engaged with a projection 411-2 on the mounting wall 411 and the other edge with the light source unit, so as to generate a rotational force about the axial center of the cylindrical portion, being applied to the light source unit. An adjusting screw 613 is provided so as to block the rotational force of the light source unit, and to rotate the entire light source unit in the θ direction about the optical axis, for adjustment of the pitch. An aperture plate 415 is disposed ahead of the light source unit. The aperture plate 415 includes slits so as to correspond to each semiconductor laser, to be mounted onto the optical housing for delimiting the emission diameter of the light beam.

FIG. 11B shows another light source unit. In FIG. 11B, the beams from a semiconductor laser 703 include four emission sources that are to be synthesized by a beam synthesizer. Numeral 706 represents a fastening plate, 705 a base plate, 708 a collimate lens and 710 a holder plate, respectively. The embodiment of FIG. 11B is different from the example shown in FIG. 11A in that just one semiconductor laser 703 is provided as the light source and, accordingly, one fastening plate 706, but the remaining portion of the configuration is basically the same.

FIG. 11C is based on FIG. 11B, and shows a beam synthesizer that synthesizes the light beams from a semiconductor laser array having four emission sources. Since the basic structure is similar to that of FIGS. 6A and 6B, overlapping description is omitted.

Figure 12:
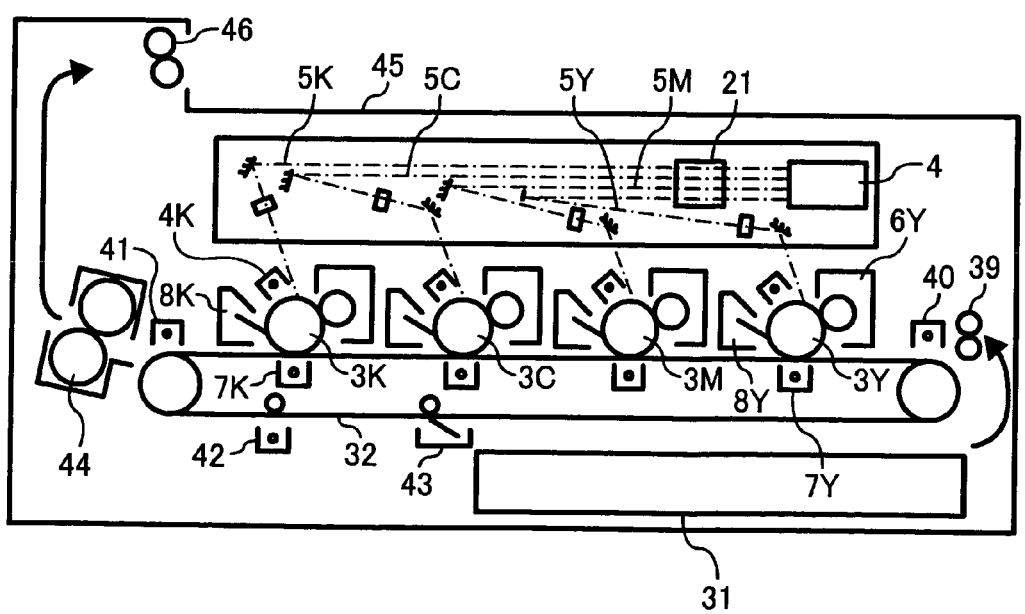
FIG. 12 is a front view schematically showing an image forming apparatus according to a sixth embodiment of the present invention.

An image forming apparatus including the optical scanner according to the above embodiments will now be described, referring to FIG. 12 as a sixth embodiment. In the sixth embodiment, the optical scanner according to the present invention is incorporated in a tandem engine full-color laser printer. In FIG. 12, in a lower portion inside the apparatus, a conveyor belt 32 is installed, to convey transfer paper (not shown) fed from a paper cassette 31 horizontally disposed. On the conveyor belt 32, a photoconductor 3Y for yellow Y, a photoconductor 3M for magenta M, a photoconductor 3C for cyan C and a photoconductor 3K for black K are sequentially aligned at regular intervals from an upstream side in the paper feeding direction. Hereinafter, the codes Y, M, C and K will be added to the numerals for the sake of explicitness, where appropriate and refer to yellow, magenta, cyan and black, respectively. The photoconductors 3Y, 3M, 3C and 3K are of the same diameter, and, respectively, provided with processing devices that execute processes according to an electrophotography process. Regarding the photoconductor 3Y as an example, a charger 4Y, a scanning optical system 5Y, a developer 6Y, a transfer charger 7Y, a cleaner 8Y are sequentially disposed around the photoconductor 3Y. This equally applies to other photoconductors 3M, 3C and 3K. In the sixth embodiment, the surfaces of the photoconductors 3Y, 3M, 3C and 3K correspond to the scanning surfaces or planes to be irradiated for the respective colors, and hence the scanning optical systems 5Y, 5M, 5C and 5K are provided to the respective photoconductors in one-to-one correspondence. However, a first scanning lens 21 is utilized in common by Y, M, C and K. A resist roller 39 and a belt charger 40 are disposed around the conveyor belt 32 on an upstream side of the photoconductor 5Y, and a belt separation charger 41, an antistatic charger 42 and a cleaning unit 43 are sequentially disposed on a downstream side, along the belt rotating direction from the photoconductor 3K. Also, a fixing unit 44 is disposed on a downstream side in the paper feeding direction from the belt separation charger 41. The fixing unit 44 is connected to a paper discharge tray 35 via a paper discharge roller 46.

In such a basic structure, under the full-color mode (multicolor mode) for example, the respective optical scanners 5Y, 5M, 5C and 5K scan the photoconductors 3Y, 3M, 3C and 3K based on image signals of the respective colors Y, M, C and K, so as to form an electrostatic latent image according to the color signals on the respective surface of the photoconductors. The electrostatic latent images are developed by the corresponding developers (6) with the color toner to thus turn into a toner image, and electrostatically adsorbed on the belt 32 and sequentially transferred and overlaid onto the transfer paper being conveyed, so that a full-color image is formed on the transfer paper. This full-color image is fixed by the fixing unit 44 and then discharged to the paper discharge tray 45 by the discharge roller 46.

Employing the optical scanner according to the sixth embodiment as the scanning optical systems 5Y, 5M, 5C and 5K of the image forming apparatus allows for effective correction of the scanning line curvature and degradation in wavefront aberration, to thereby provide an image forming apparatus that can reproduce high-quality images free from color deviation.

While FIG. 12 relates to the sixth embodiment of the one-side scanning type optical scanner, a similar structure can be applied to the counter scanning type optical scanner, as shown in FIGS. 2A and 2B. In FIG. 2A, the first scanning lenses 21-1 and 21-2 are disposed on both sides of the polygon mirror 4 serving as the light deflector. A laser light beam emitted by the semiconductor lasers 1-1 and 1-2 serving as the light source disposed on one side across the polygon mirror 4 is reflected by the polygon mirror 4 and transmitted through the first scanning lens 21-1, and further through the second scanning lenses 22-1 and 22-2 individually corresponding to the laser light beam, after which the optical path is bent by an appropriate mirror so that the laser light beam reaches the corresponding photoconductors 3Y and 3M. Likewise, a laser light beam emitted by the semiconductor lasers 1-3 and 1-4 serving as the light source disposed on the other side across the polygon mirror 4 is reflected by the polygon mirror 4 and transmitted through the first scanning lens 21-2, and further through the second scanning lenses 22-3 and 22-4 individually corresponding to the laser light beam, after which the optical path is bent by an appropriate mirror so that the laser light beam reaches the corresponding photoconductors 3C and 3K.

FIG. 2B shows another example of the light source. While in FIG. 2A a plurality of light sources are separately disposed on one side and the other side across the polygon mirror 4, in FIG. 2B four light sources 1-1 to 1-4 are disposed close to one another. Such arrangement can be achieved by appropriately changing the direction of the laser light beam emitted by these light sources with a mirror. Either in FIG. 2A or 2B, all of the light beams from the light sources are inclined in the sub-scanning direction with respect to the plane normal to the reflecting surface of the light deflector, and at least one of the surfaces of the scanning optical system is a surface without a curvature in the sub-scanning direction, and is a special surface that has different tilt decentration angles in the sub-scanning direction according to a position in the main scanning direction. Accordingly, the concept of the present invention is duly embodied.

Hereinafter, examples of the optical scanner according to the present invention with specific numerical values will be cited.

Numerical Example 1

In example 1, the semiconductor laser employed as the light source has an emission wavelength of 655 nm, and the divergent beam thereby emitted is converted into a "substantially parallel beam" by a coupling lens having a focal length of 15 millimeters. Thus forming a "lengthy line image in the main scanning direction" on the position of the deflecting surface of the polygon mirror surface, via a cylindrical lens having a focal length of 70 millimeters. The polygon mirror has six deflecting surfaces and an inscribed radius of 18 millimeters. Also, the rotating shaft and the deflecting surfaces are formed in parallel, and the light beam is made incident at an oblique angle upon the deflecting surface at 2.4 degrees in the sub-scanning direction, while in the main scanning direction a light beam directed to the field height 0 is made incident at approximately 60 degrees. The aperture that delimits the light beam output from the coupling lens is of a rectangular shape of 5.3 millimeters in the main scanning direction and 1.3 millimeters in the sub-scanning direction.

Table 1 shows the data of the scanning optical system of Example 1. The lens L1 is represented by surface numbers 1 and 2 and is disposed parallel to the deflecting surface (the light beam is made incident at an oblique angle on the lens at 2.4 degrees). The surface profile employs a line including the position where the light beam directed to field height 0 passes through the special surface (i.e., the position where the light beam passes through the second surface of the lens L1), and parallel to the normal of the deflecting surface, as the optical axis in the formula defining the lens shape. The lenses L2 are represented by surface numbers 3 and 4 and are oriented such that the optical axis of the lens and the incoming beam are aligned (i.e., inclined by 2.4 degrees) so that the light beam does not obliquely enter the lens.

TABLE 1

| Surface number | RY (mm) | RZ (mm) | X (mm) | N | Remarks |
|---|---|---|---|---|---|
| Deflecting surface | ∞ | ∞ | 40.25 | — | Deflecting surface |
| 1* | −121.451 | ∞ | 8.40 | 1.5273 | Scanning/imaging lens |
| 2* | −62.004 | ∞ | 99.60 | — | — |
| 3* | −2917.424 | ∞ | 3.80 | 1.5273 | Scanning/imaging lens |
| 4** | 1538.726 | −38.281 | 142.61 | — | — |
| 5 | — | — | — | — | Scanning surface |

The surfaces with an asterisk in Table 1 are of a non-arcuate shape in the main scanning direction, and flat in the sub-scanning direction.

The lens surface profile is defined by the following Formula (3). Surfaces 2 and 3 are special surfaces.

$$(Y, Z) = \frac{Y^2 \cdot Cm}{1 + \sqrt{[1 - (1+K) \cdot (Y \cdot Cm)^2]}} + A \cdot Y^4 + B \cdot Y^6 + C \cdot Y^8 + D \cdot Y^{10} + E \cdot Y^{12} + F \cdot Y^{14} + \frac{Cs(Y) \cdot Z^2}{1 + \sqrt{[1 - (Cs(Y) \cdot Z)^2]}} + (F0 + F1 \cdot Y + F2 \cdot Y^2 + F3 \cdot Y^3 + F4 \cdot Y^4 + \ldots)Z \quad (3)$$

wherein, Cm=1/RY, Cs(Y)=1/RZ.

The surfaces with a double-asterisk in Table 1 are of a non-arcuate shape in the main scanning direction, and the special toroidal surfaces with the radius of curvature that continuously varies according to the lens height. This surface profile is defined by the Formula (3). However, Cs(Y) is defined by the following Formula (4).

$$Cs(Y)=1/RZ+aY+bY^2+cY^3+dY^4+eY^5+fY^6+gY^7+ hY^8+iY^9+jY^{10}+kY^{11}+lY^{12} \quad (4)$$

The aspherical coefficients of these examples are as shown in Table 2.

TABLE 2

| | Surface 1 | Surface 2 | Surface 3 | Surface 4 |
|---|---|---|---|---|
| RZ | −121.451 | −62.004 | −2917.424 | 1538.726 |
| K | 3.601E−03 | −6.251E−04 | 7.173E+02 | −1.132E+02 |
| A | −1.931E−07 | 1.322E−07 | 3.371E−09 | −9.989E−08 |
| B | 1.594E−10 | 4.763E−11 | −1.249E−12 | 4.896E−12 |
| C | 3-3.244E−14 | −5.014E−15 | −6.122E−17 | −4.307E−16 |
| D | −6.432E−18 | 1.221E−17 | 1.175E−22 | 1.371E−20 |
| E | 4.502E−21 | 7.213E−22 | 1.488E−26 | −5.751E−25 |
| F | 3.199E−27 | 3.192E−27 | — | — |
| RZ | ∞ | ∞ | ∞ | −38.281 |
| a | — | — | — | −5.259E−07 |
| b | — | — | — | 1.015E−06 |
| c | — | — | — | −2.196E−10 |
| d | — | — | — | −1.179E−10 |
| e | — | — | — | 6.246E−14 |
| f | — | — | — | 7.601E−15 |
| g | — | — | — | −1.281E−17 |
| h | — | — | — | 5.482E−19 |
| i | — | — | — | 1.638E−21 |
| j | — | — | — | −1.873E−22 |
| k | — | — | — | −9.165E−26 |
| l | — | — | — | 1.108E−26 |
| F0 | — | — | — | — |
| F1 | — | 1.190E−05 | 6.269E−06 | — |
| F2 | — | 2.631E−05 | 9.410E−07 | — |
| F3 | — | — | −4.281E−10 | — |
| F4 | — | 4.585E−09 | −4.801E−11 | — |
| F5 | — | — | 1.035E−14 | — |
| F6 | — | −1.780E−11 | −8.398E−15 | — |

TABLE 2-continued

| | Surface 1 | Surface 2 | Surface 3 | Surface 4 |
|---|---|---|---|---|
| F7 | — | — | — | — |
| F8 | | 7.387E−15 | 1.022E−18 | — |
| F9 | | — | | |
| F10 | | 8.002E−18 | | |
| F11 | | — | | |
| F12 | — | −4.170E−21 | 1.130E−19 | — |

In this optical system, a soundproof glass (refraction factor 1.5143) of 1.9 millimeters in thickness is inserted, and inclined by 10 degrees in the deflecting plane. The numerical values represent the data of the scanning lens upon which the light beam is made incident at an oblique angle of 2.4 degrees under the counter scanning system. On the side of −2.4 degrees, the shape in the main scanning direction is identical, but the shape with the sign of the special surface coefficients is inverted, i.e., a mirror-symmetrical shape in the sub-scanning direction with respect to the values of these examples. Also, the optical axis (the origin point of the formula) of the lens shape formula for the special surface is as described earlier, and the scanning lens L1 in particular, which is shared, employs the line including the position where the light beam directed to field height 0 passes through the special surface, i.e., the position where the light beam passes through the second surface of the first scanning lens L1, and parallel to the normal of the deflecting surface, with 2.4 degrees and −2.4 degrees of the oblique incidence angles. The origin point is not limited to these examples, but may be appropriately determined at design time, so as to achieve similar advantages. In this numerical example, the scanning line curvature is corrected from 110 micrometers to 1 micrometers, by employing the special surface.

Figure 13A:
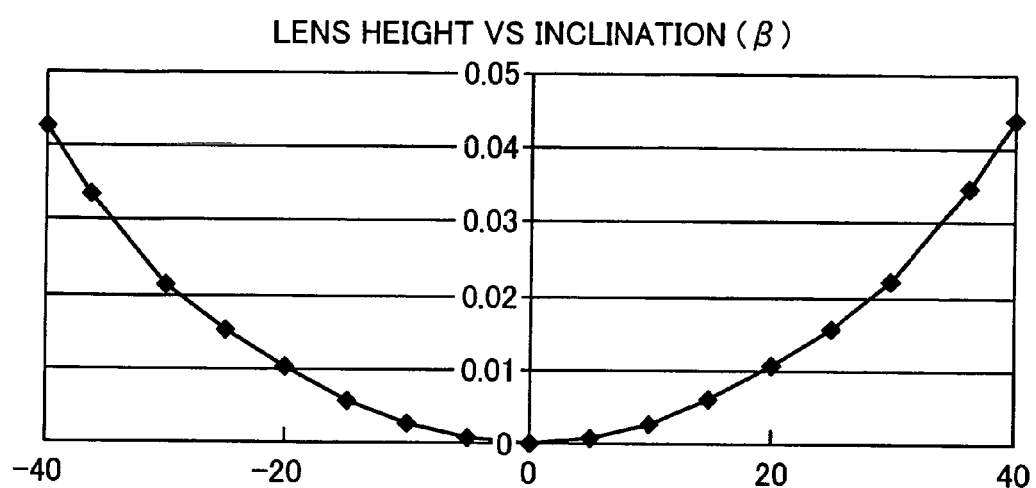
FIGS. 13A and 13B are light path diagrams showing the condition in a case where light beams are directed upward by the deflecting surface, in the incident surface of the scanning lens, the higher the light beams made incident on the incidence surface in peripheral field height, the further the light beams pass through the upper scanning lens.
Figure 13B:
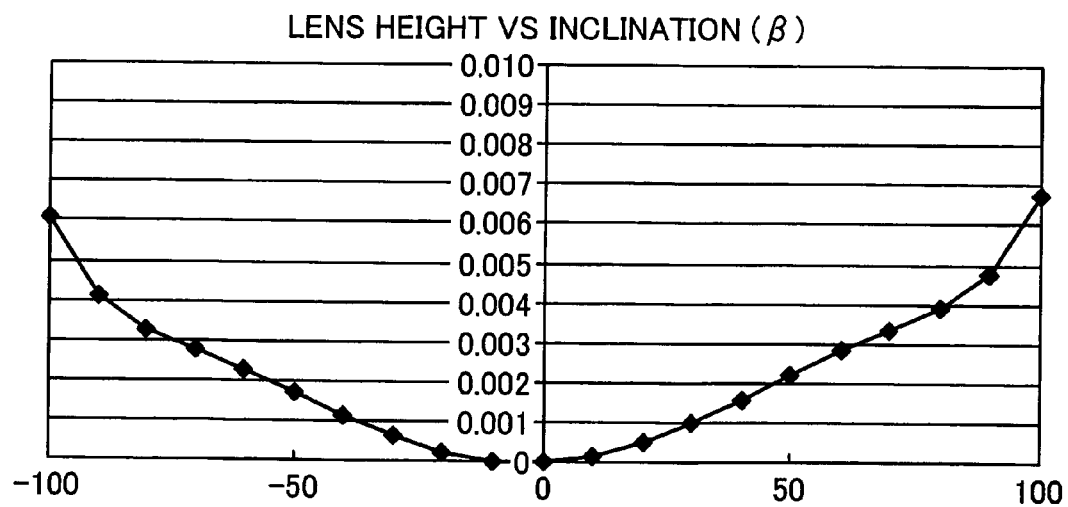

FIGS. 13A and 13B show the fluctuation in tilting amount of the special surface according to different field heights in the numerical example. FIG. 13A shows the inclination of the second surface of the scanning lens closest to the polygon mirror, and FIG. 13B shows the inclination of the first surface of the scanning lens closer to the scanning surface. The sign of the inclination value is to be inverted according to the direction of the oblique incidence angle upon the deflecting surface.

Figure 14A:
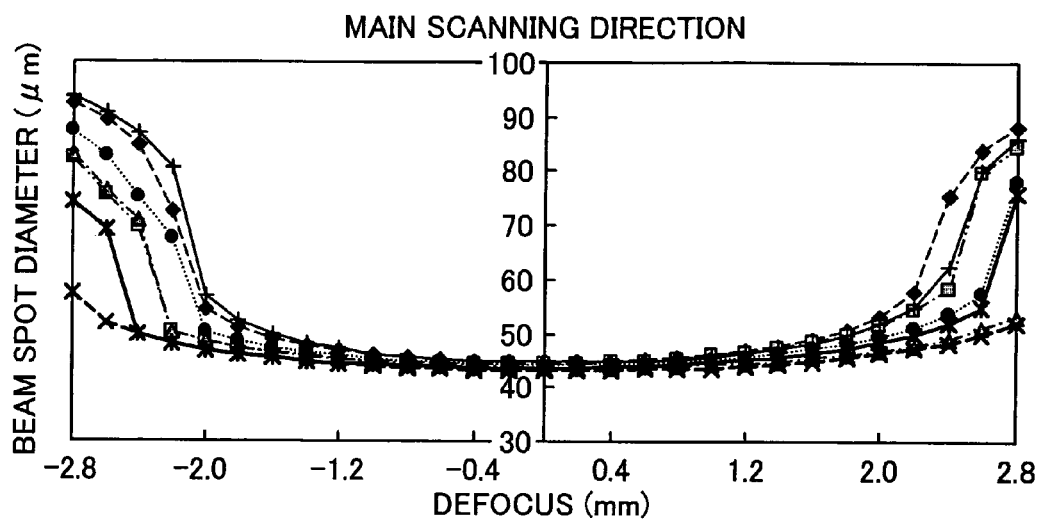
FIGS. 14A and 14B are graphs showing beam spot diameters on an scanning surface, after correction of the wavefront aberration by a special decentered tilting surface.
Figure 14B:
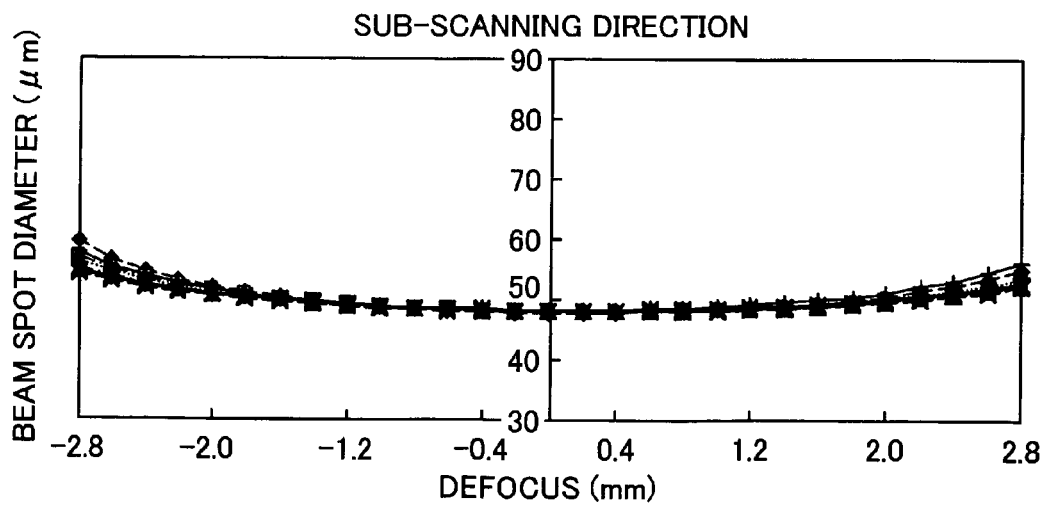

FIGS. 14A and 14B are graphs showing the beam spot diameters on the scanning surface, after correction of the wavefront aberration by a special decentered tilting surface. In view of the graphs, it is understood that the wavefront aberration is appropriately corrected and the beam spot diameter is appropriately kept from swelling.

Figure 15A:
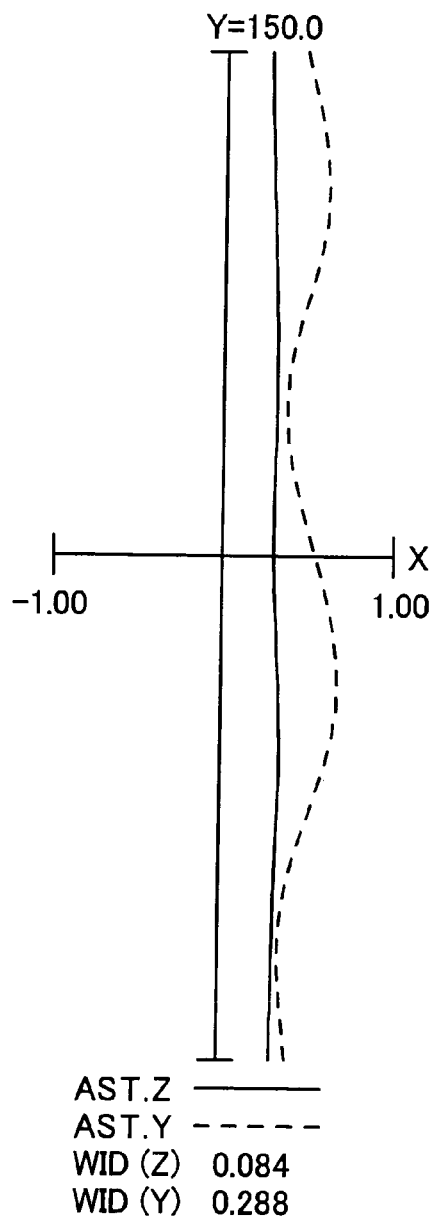
FIG. 15A is a chart showing optical characteristics relevant to the optical scanner according to the embodiments of the present invention, specifically, showing field curvature in the main and sub-scanning directions.
Figure 15B:
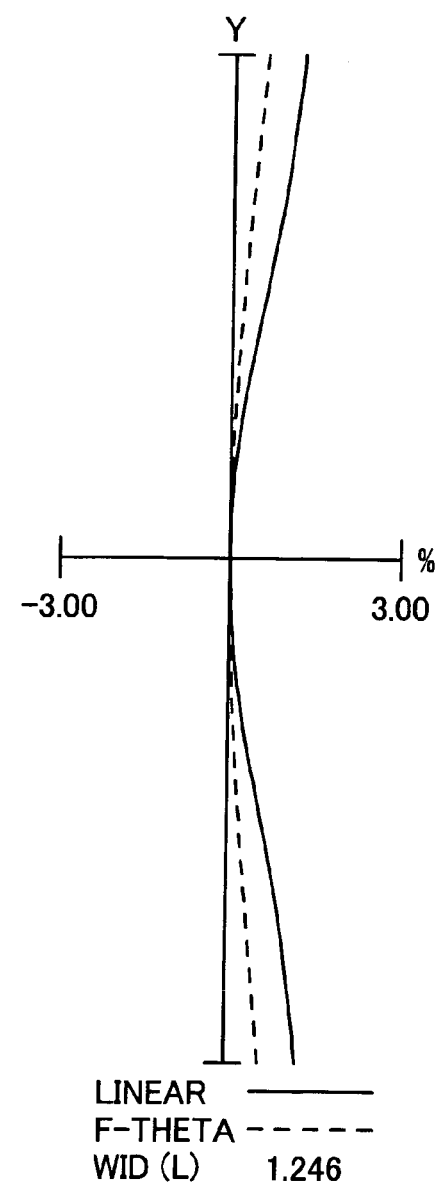
FIG. 15B is a chart showing optical characteristics relevant to the optical scanner according to the embodiments of the present invention, specifically, showing aberration between the fθ characteristic and linearity.

FIGS. 15A and 15B are charts showing optical characteristics relevant to the optical scanner according to the numerical example. FIG. 15A shows field curvature in the main and sub-scanning directions. FIG. 15B shows aberration in the fθ characteristic and linearity. As is apparent from FIGS. 15A and 15B, the optical performance is appropriately corrected by using the embodiments of the present invention.

According to the present invention, including at least one surface of the scanning optical system that does not have a curvature in the sub-scanning direction, which is a special surface having different tilt decentration angles in the sub-scanning direction according to a position in the main scanning direction, allows for effective correction of a scanning line curvature and degradation in wavefront aberration in the optical scanner. This correction is possible regardless if all light beams from the light source units have differing angles in a sub-scanning direction with respect to the plane normal to a deflecting surface of the light deflector. In further accordance with the present invention, an image forming apparatus is provided that includes such optical scanner.

The present invention also allows for reducing the dimensions of the light deflector and the rotation speed of a polygon mirror by adopting the multi-beam system, which leads to a reduction in power consumption, thus providing an environmentally-friendly optical scanner and an image forming apparatus that includes such an optical scanner.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanner comprising:
   a plurality of light source units, each light source unit outputting a corresponding light beam;
   a light deflector having a deflecting surface that deflects the light beams output from the light source units; and
   a scanning optical system that condenses each light beam deflected by the light deflector onto a corresponding scanning surface,
   wherein a direction in which the light beams scan the scanning surface is a main scanning direction,
   wherein the light beams output from the light source units make an angle in a sub-scanning direction with respect to a plane normal to the deflecting surface,
   wherein the sub-scanning direction is a direction perpendicular to the main scanning direction,
   wherein at least one surface of the scanning optical system is a surface that does not have a curvature in the sub-scanning direction and wherein a line describing the surface in the sub-scanning direction has a tilt which varies depending on a location of the line in the main scanning direction, and
   wherein the tilt of the line defines an angle which is measured with respect to the sub-scanning direction.

2. The optical scanner according to claim 1, wherein a plurality of pairs of light beams are output from the light source units, each pair of light beams having a different angle in the sub-scanning direction with respect to the plane normal to the deflecting surface, and wherein the light deflector has a plurality of deflecting surfaces and the respective pairs of light beams are made incident upon different deflecting surfaces of the same light deflector.

3. The optical scanner according to claim 1, wherein the angle measured between the sub-scanning direction and the line describing the surface in the sub-scanning direction is zero at an optical axis of the surface.

4. The optical scanner according to claim 1, wherein the scanning optical system includes at least two scanning lenses, and a first scanning lens is disposed closer to the light deflector than a second scanning lens, wherein the second scanning lens has the strongest refracting power in the sub-scanning direction, and wherein a lens surface closest to the scanning surface is the surface not having a curvature in the sub-scanning direction.

5. The optical scanner according to claim 4, wherein at least the surface not having a curvature in the sub-scanning direction of the first scanning lens is configured such that the angle measured between the sub-scanning direction and the line describing the surface in the sub-scanning direction is larger at positions farther from an optical axis of the surface in the main scanning direction than at positions closer to the optical axis.

6. The optical scanner according to claim 4, wherein at least the surface not having a curvature in the sub-scanning direction of the scanning lens closest to the scanning surface is configured such that the angle measured between the sub-scanning direction and the line describing the surface in the sub-scanning direction varies asymmetrically in the main scanning direction with respect to an optical axis of the surface.

7. The optical scanner according to claim 1, wherein the scanning optical system includes at least two scanning lenses and wherein at least a scanning lens closest to the light deflector is shared by the light beams from the light source units, and is formed integrally.

8. The optical scanner according to claim 1, wherein the surface not having a curvature in the sub-scanning direction has a shape that is symmetric with respect to a plane parallel to the normal to the deflecting surface.

9. The optical scanner according to claim 1, wherein the scanning optical system further includes at least one surface for which the curvature varies in the sub-scanning direction according to a position in the main scanning direction.

10. The optical scanner according to claim 1, wherein the light beam made incident upon the light deflector has an angle in the main scanning direction with respect to the optical axis of the scanning lens.

11. The optical scanner according to claim 1, wherein each of the plurality of light source units is comprised of a multi-beam light source unit that emits a plurality of light beams.

12. The optical scanner according to claim 1, wherein the scanning surfaces corresponding to the light source units include at least four photoconductors.

13. An image forming apparatus comprising an optical scanner, the optical scanner including:
   a plurality of light source units, each light source unit outputting a corresponding light beam;
   a light deflector having a deflecting surface that deflects the light beams output from the light source units; and
   a scanning optical system that condenses each light beam deflected by the light deflector onto a corresponding scanning surface,
   wherein a direction in which the light beams scan the scanning surface is a main scanning direction,
   wherein the light beams output from the light source units make an angle in a sub-scanning direction with respect to a normal to the deflecting surface,
   wherein the sub-scanning direction is a direction perpendicular to the main scanning direction,
   wherein at least one surface of the scanning optical system is a surface that does not have a curvature in the sub-scanning direction and wherein a line describing the surface in the sub-scanning direction has a tilt, which varies depending on a location of the line in the main scanning direction, and
   wherein the tilt of the line defines an angle which is measured with respect to the sub-scanning direction.

* * * * *